(12) United States Patent
Beel et al.

(10) Patent No.: US 11,258,676 B2
(45) Date of Patent: Feb. 22, 2022

(54) ELECTRONIC TOOL AND METHODS FOR MEETINGS

(71) Applicant: BARCO N.V., Kortrijk (BE)

(72) Inventors: Koen Simon Herman Beel, Eke (BE); Yoav Nir, Komen (BE); Filip Josephine Johan Louwet, Knesselare (BE); Guy Coen, Aalst (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 17/121,919

(22) Filed: Dec. 15, 2020

(65) Prior Publication Data

US 2021/0336859 A1 Oct. 28, 2021

Related U.S. Application Data

(63) Continuation of application No. 14/725,401, filed on May 29, 2015, now Pat. No. 10,904,103, which is a
(Continued)

(51) Int. Cl.
*G06F 13/14* (2006.01)
*H04L 41/22* (2022.01)
(Continued)

(52) U.S. Cl.
CPC .......... *H04L 41/22* (2013.01); *G06F 3/04842* (2013.01); *G06F 9/00* (2013.01);
(Continued)

(58) Field of Classification Search
None
See application file for complete search history.

(56) References Cited

U.S. PATENT DOCUMENTS 6,601,087 B1 7/2003 Zhu et al.
6,966,035 B1 11/2005 Suess et al.
(Continued)

FOREIGN PATENT DOCUMENTS

CN 1317112 10/2001
CN 1476242 2/2004
(Continued)

OTHER PUBLICATIONS

European Search Report in corresponding European Application No. 20212054.9, dated Apr. 7, 2021.
(Continued)

*Primary Examiner* — Scott C Sun
(74) *Attorney, Agent, or Firm* — Hamre, Schumann, Mueller & Larson, P.C.

(57) ABSTRACT

An electronic meeting tool and method for communicating arbitrary media content from users at a meeting includes a node configuration adapted to operate a display node of a communications network, the display node being coupled to a first display. The node configuration is adapted to receive user selected arbitrary media content and to control display of the user selected arbitrary media content on the first display. A peripheral device adapted to communicate the user selected arbitrary media content via the communications network is a connection unit including a connector adapted to couple to a port of a processing device having a second display, a memory and an operating system, and a transmitter. A program is adapted to obtain user selected arbitrary media content, the program leaving a zero footprint on termination. The user may trigger a transfer of the user selected arbitrary media content to the transmitter.

20 Claims, 5 Drawing Sheets

Related U.S. Application Data continuation of application No. 14/212,170, filed on Mar. 14, 2014, now Pat. No. 9,083,769, which is a continuation-in-part of application No. 13/270,659, filed on Oct. 11, 2011, now Pat. No. 8,756,348, and a continuation-in-part of application No. PCT/EP2012/068166, filed on Sep. 14, 2012, which is a continuation-in-part of application No. 13/270,659, filed on Oct. 11, 2011.

(60) Provisional application No. 61/534,592, filed on Sep. 14, 2011, provisional application No. 61/635,219, filed on Apr. 18, 2012.

(51) Int. Cl.

| | | |
|---|---|---|
| H04L 12/18 | (2006.01) | |
| H04L 51/00 | (2022.01) | |
| H04L 65/00 | (2022.01) | |
| H04L 65/401 | (2022.01) | |
| H04L 65/4038 | (2022.01) | |
| H04M 3/56 | (2006.01) | |
| H04N 5/00 | (2011.01) | |
| G06F 3/04842 | (2022.01) | |
| G06F 9/00 | (2006.01) | |
| G06F 13/10 | (2006.01) | |
| G06F 13/38 | (2006.01) | |
| H04L 65/403 | (2022.01) | |
| H04N 7/14 | (2006.01) | |

(52) U.S. Cl.
CPC ............ *G06F 13/102* (2013.01); *G06F 13/14* (2013.01); *G06F 13/385* (2013.01); *H04L 12/1813* (2013.01); *H04L 12/1822* (2013.01); *H04L 51/00* (2013.01); *H04L 65/00* (2013.01); *H04L 65/403* (2013.01); *H04L 65/4023* (2013.01); *H04L 65/4038* (2013.01); *H04M 3/567* (2013.01); *H04N 5/00* (2013.01); *H04N 7/142* (2013.01)

(56) References Cited

U.S. PATENT DOCUMENTS

| | | | |
|---|---|---|---|
| 7,584,313 | B1 | 9/2009 | Hay et al. |
| 7,762,470 | B2 | 7/2010 | Finn et al. |
| 7,853,535 | B2 | 12/2010 | Colella |
| 7,908,401 | B2 | 3/2011 | Chang |
| 8,069,465 | B1 | 11/2011 | Bartholomay et al. |
| 8,316,138 | B2 | 11/2012 | Chang |
| 8,327,410 | B2 | 12/2012 | Andersen et al. |
| 8,346,753 | B2 | 1/2013 | Hayes |
| 8,521,926 | B2 | 8/2013 | Hsueh et al. |
| 8,601,470 | B2 | 12/2013 | Yue et al. |
| 8,717,599 | B2 | 5/2014 | Ochiai et al. |
| 8,896,656 | B2 | 11/2014 | Epstein et al. |
| 2002/0054044 | A1 | 5/2002 | Lu et al. |
| 2002/0174254 | A1 | 11/2002 | Kita et al. |
| 2002/0196378 | A1 | 12/2002 | Slobodin et al. |
| 2003/0120849 | A1 | 6/2003 | Roslak et al. |
| 2004/0012669 | A1 | 1/2004 | Drell et al. |
| 2004/0125777 | A1 | 7/2004 | Doyle et al. |
| 2004/0128354 | A1 | 7/2004 | Horikiri et al. |
| 2004/0263636 | A1 | 12/2004 | Cutler et al. |
| 2005/0015719 | A1 | 1/2005 | Marchon et al. |
| 2005/0036509 | A1 | 2/2005 | Acharya et al. |
| 2005/0122392 | A1 | 6/2005 | Johansen et al. |
| 2006/0010116 | A1 | 1/2006 | Yaguchi et al. |
| 2006/0031779 | A1 | 2/2006 | Theurer et al. |
| 2006/0080707 | A1 | 4/2006 | Laksono |
| 2006/0095376 | A1 | 5/2006 | Mitchell et al. |
| 2006/0101116 | A1 | 5/2006 | Rittman |
| 2006/0233191 | A1 | 10/2006 | Pirzada et al. |
| 2007/0005809 | A1 | 1/2007 | Kobayashi et al. |
| 2007/0033289 | A1 | 2/2007 | Nuyttens et al. |
| 2007/0065078 | A1 | 3/2007 | Jiang |
| 2007/0109410 | A1 | 5/2007 | Siew |
| 2007/0162661 | A1 | 7/2007 | Fu et al. |
| 2007/0168481 | A1 | 7/2007 | Lambert et al. |
| 2007/0206088 | A1 | 9/2007 | Mizunashi et al. |
| 2007/0244970 | A1 | 10/2007 | Watanabe et al. |
| 2008/0088634 | A1 | 4/2008 | Thompson et al. |
| 2008/0182518 | A1 | 7/2008 | Lo |
| 2009/0023475 | A1 | 1/2009 | Chang et al. |
| 2009/0029647 | A1 | 1/2009 | Wei et al. |
| 2009/0046139 | A1 | 2/2009 | Cutler et al. |
| 2009/0064302 | A1 | 3/2009 | Colella |
| 2009/0092198 | A1 | 4/2009 | Motoyoshi et al. |
| 2009/0189981 | A1 | 7/2009 | Siann et al. |
| 2009/0198839 | A1 | 8/2009 | Banerjee et al. |
| 2009/0235170 | A1 | 9/2009 | Golden et al. |
| 2009/0247006 | A1 | 10/2009 | Thompson |
| 2009/0251621 | A1 | 10/2009 | Ichieda |
| 2009/0300520 | A1 | 12/2009 | Ashutosh et al. |
| 2010/0022274 | A1 | 1/2010 | Roberts et al. |
| 2010/0064063 | A1 | 3/2010 | Deforche et al. |
| 2010/0066806 | A1 | 3/2010 | Lyu |
| 2010/0077021 | A1 | 3/2010 | Hsueh et al. |
| 2010/0079783 | A1 | 4/2010 | Naganuma et al. |
| 2010/0087139 | A1 | 4/2010 | Glass |
| 2010/0091987 | A1 | 4/2010 | Takahashi et al. |
| 2010/0115145 | A1 | 5/2010 | Banerjee et al. |
| 2010/0149206 | A1 | 6/2010 | Shigehisa et al. |
| 2010/0154014 | A1 | 6/2010 | Andersen et al. |
| 2010/0297964 | A1 | 11/2010 | Austin et al. |
| 2010/0302130 | A1 | 12/2010 | Kikuchi et al. |
| 2010/0302454 | A1 | 12/2010 | Epstein et al. |
| 2010/0309896 | A1 | 12/2010 | Sugiyama et al. |
| 2010/0332663 | A1 | 12/2010 | Chang |
| 2011/0010470 | A1 | 1/2011 | Hulbert et al. |
| 2011/0010607 | A1 | 1/2011 | Raveendran |
| 2011/0023096 | A1 | 1/2011 | Xiao et al. |
| 2011/0038005 | A1 | 2/2011 | Ochiai et al. |
| 2011/0078716 | A1 | 3/2011 | MacWan |
| 2011/0092198 | A1 | 4/2011 | Miyata |
| 2011/0115689 | A1 | 5/2011 | Sugiyama et al. |
| 2011/0150433 | A1 | 6/2011 | Alexandrov et al. |
| 2011/0179182 | A1 | 7/2011 | Vadla Ravnas |
| 2011/0180380 | A1 | 7/2011 | Lee |
| 2011/0188391 | A1 | 8/2011 | Sella et al. |
| 2011/0210983 | A1 | 9/2011 | Theimer et al. |
| 2011/0222556 | A1 | 9/2011 | Shefler et al. |
| 2012/0054372 | A1 | 3/2012 | Chen et al. |
| 2012/0331509 | A1 | 12/2012 | Laksono |
| 2013/0050254 | A1 | 2/2013 | Tran et al. |
| 2013/0054348 | A1 | 2/2013 | Holsman et al. |
| 2013/0060662 | A1 | 3/2013 | Carlson et al. |
| 2013/0067121 | A1 | 5/2013 | Beel et al. |
| 2014/0082227 | A1 | 3/2014 | Beel et al. |

FOREIGN PATENT DOCUMENTS

| | | |
|---|---|---|
| CN | 1499841 A | 5/2004 |
| CN | 1525300 A | 9/2004 |
| CN | 1550996 | 12/2004 |
| CN | 1555197 A | 12/2004 |
| CN | 1609780 | 4/2005 |
| CN | 1689275 A | 10/2005 |
| CN | 1788494 A | 6/2006 |
| CN | 101022529 A | 8/2007 |
| CN | 101046952 A | 10/2007 |
| CN | 101075896 A | 11/2007 |
| CN | 101106469 A | 1/2008 |
| CN | 101106681 A | 1/2008 |
| CN | 101442500 A | 5/2009 |
| CN | 101566940 A | 10/2009 |
| CN | 101572794 | 11/2009 |
| CN | 101828392 A | 9/2010 |
| CN | 101917402 | 12/2010 |
| CN | 101965609 | 2/2011 |
| CN | 101631223 | 4/2011 |
| CN | 102023852 A | 4/2011 |

(56) References Cited

FOREIGN PATENT DOCUMENTS

| | | |
|---|---|---|
| CN | 102025774 A | 4/2011 |
| CN | 102045864 | 5/2011 |
| CN | 102065267 | 5/2011 |
| CN | 102088593 A | 6/2011 |
| CN | 101454762 | 6/2013 |
| EP | 1187480 A1 | 3/2002 |
| EP | 1246395 A1 | 10/2002 |
| EP | 1329055 | 7/2003 |
| EP | 1385336 | 1/2004 |
| EP | 1462998 A2 | 9/2004 |
| EP | 2107463 A2 | 10/2009 |
| EP | 2756668 A | 7/2014 |
| JP | 2000242257 | 9/2000 |
| JP | 2006-185359 | 7/2006 |
| JP | 2007148904 A | 6/2007 |
| JP | 2008-090561 | 4/2008 |
| JP | 2008165007 | 7/2008 |
| JP | 2008/271265 A | 11/2008 |
| JP | 2009-080663 | 4/2009 |
| JP | 2010-263326 | 11/2010 |
| TW | 201012222 A | 3/2010 |
| WO | 00/52887 A1 | 9/2000 |
| WO | 2001/089156 A2 | 11/2001 |
| WO | 2007/137415 A1 | 12/2007 |
| WO | 2010/008866 | 1/2010 |
| WO | 2010/105335 | 9/2010 |
| WO | 2010/135894 | 12/2010 |
| WO | 2010135894 A1 | 12/2010 |
| WO | 2013037979 | 3/2013 |

OTHER PUBLICATIONS

European Office Action in corresponding European Application No. 16207123.7, dated Nov. 23, 2020.
U.S. Office Action in corresponding U.S. Appl. No. 16/852,790, dated Oct. 8, 2020.
Chinese Office Action in corresponding Chinese Application No. 201810229467.1, dated Apr. 7, 2020.
Chinese Office Action in corresponding Chinese Application No. 201811092577.4, dated Apr. 7, 2020.
Office Action in related Chinese Office application 202010418842.4 dated May 28, 2021, with English translation (17 pages).
Office Action in related Chinese Office application 202010418639.7 dated May 28, 2021, with English translation (22 pages).
Office Action in related Chinese Office application 2020104186753 dated May 28, 2021, with English translation (17 pages).
Summons to Attend Oral Proceedings in corresponding European Application No. 12762258.7, dated May 20, 2021.
Non-Final Office Action in related U.S. Appl. No. 16/812,755 dated Feb. 19, 2021.
"Universal Serial Bus 3.0 Specification", Revision 1.0 Nov. 12, 2008.
"Wireless Universal Serial Bus Specification 1.1", Revision 1.1 Sep. 9, 2010.
Austin et al., "Determinants and Patterns of Control over Technology in a Computerized Meeting Room," CSCW 90 Proceedings, pp. 39-51 (Oct. 1990).
Roth, "Building Group Decision Support Rooms Using 'Off-the-Shelf' Computing Resources: Prospects and Issues," Database, pp. 21-31 (May 1993).
Gray, et al., "The User Interface in Group Decision Support Systems," Group Support Systems: New Perspectives, Ch. 10, Macmillan Publishing Company, New York (1993).
Products, components, systems, and methods in public use and/or sale related to the Epson Quick Wireless Connection USB key and Quick Wireless Connection , developed by Epson (accessed Jul. 7, 2017).
Products, components, systems, and methods in public use and/or sale related to the IOGEAR GUW2015VKIT Wireless USB to VGA Adapter Kit, developed by IOGEAR (accessed Jul. 17, 2017).
Products, components, systems, and methods in public use and/or sale related to the ActionTec MyWirelessTV HDMI Transmitter, developed by ActionTec and Cavium (accessed Feb. 3, 2020).
European Search Report dated Aug. 1, 2017, for EP 16207123.
European Extended Search Report dated Nov. 3, 2016, for EP 16170760.9.
Chinese Office Action dated Oct. 14, 2016, for CN 201280055744. 2.
Chinese Office Action dated Oct. 10, 2016, for CN 201280055667. 0.
Final Office Action in corresponding U.S. Appl. No. 14/395,364 dated Nov. 2, 2016.
Office Action in related U.S. Appl. No. 14/725,401 dated Dec. 31, 2019.
Summons to attend oral proceedings in corresponding EP 12762258.7 dated Dec. 12, 2 019.
Chinese Office Action in corresponding Chinese Application No. 201280074077.2, dated Sep. 30, 2019.
U.S. Office Action in corresponding U.S. Appl. No. 14/278,442, dated Sep. 18, 2019.
Notice on Reexamination in corresponding Chinese Application No. 201280001542.X, dated Jun. 11, 2019.
European Office Action in corresponding European Application No. 12759440.6-1204, dated May 28, 2019.
U.S. Office Action in corresponding U.S. Appl. No. 15/449,048, dated Apr. 8, 2019.
European Office Action in corresponding European Application No. 12775162.6-1204, dated May 21, 2019.
Chinese Office Action in corresponding Chinese Application No. 2012800740//.2, dated Mar. 5, 2019.
European Office Action in corresponding European Application No. 16170760.9-1216, dated Apr. 2, 2019.
Non-Final Office Action in corresponding U.S. Reexamination No. 90/014,088, dated Sep. 25, 2018.
Final Office Action in corresponding U.S. Reexamination No. 90/014,087, dated Jan. 22, 2019.
Chinese Office Action in related Chinese Application No. 201280001542.X, dated Jan. 2, 2019.
https://www.infocus.com/resources/documents/User-Guides/Liteshow-3-UserGuide.pdf, accessed Oct. 3, 2018.
http://esupport.epson-europe.com/ViewArticle.aspx?lng=sv-SE&kbid=328038&data=bOU002FRIftu7YFtMOBp2mpSKntPq1A26Wyw&cl=1, accessed Jul. 8, 2017.
SIPO Office Action in corresponding app. CN 201280074077.2 dated Aug. 23, 2018.
Office Action in corresponding U.S. Appl. No. 15/449,048 dated Oct. 12, 2018.
SIPO Office Action in corresponding app. CN 201280001542.X dated Jul. 30, 2018.
EPO Office Action in corresponding app. EP 12759440.6-1204 dated Aug. 9, 2018.
EPO Office Action in corresponding app. EP 12775162.6-1204 dated Aug. 9, 2018.
Office Action in corresponding U.S. Appl. No. 14/725,401 dated Sep. 10, 2018.
Office Action in corresponding U.S. Appl. No. 90/014,087 dated Sep. 4, 2018.
Office Action in corresponding U.S. Appl. No. 16/034,846 dated Oct. 7, 2019.
Office Action in corresponding U.S. Appl. No. 14/344,830 dated Sep. 28, 2017.
Office Action in corresponding U.S. Appl. No. 14/344,830 dated Oct. 6, 2016.
Linq Software User's Guide, Smart Technologies Inc., Copyright 2004-2005, Version 1.0, pp. 1-19.
Chinese Notice on Reexamination in corresponding Chinese Application No. 201280074077.2, dated Mar. 31, 2020.
European Office Action in corresponding European Application No. 12775162.6, dated Apr. 14, 2020.
Brazil Office Action in corresponding Brazil Application No. BR112014026147-4, dated Apr. 8, 2020.
Brazil Office Action in corresponding Brazil Application No. BR122015022158-7, dated Apr. 8, 2020.

(56) References Cited

OTHER PUBLICATIONS

U.S. Office Action in corresponding U.S. Appl. No. 16/034,846, dated Jun. 25, 2020.
International Search Report (ISR) dated Mar. 6, 2013, for PCT/EP2012/068166.
International Search Report (ISR) dated Mar. 19, 2013, for PCT/EP2012/068167.
International Search Report (ISR) dated Mar. 4, 2013, for PCT/EP2012/068168.
International Search Report (ISR) dated Jan. 28, 2013, for PCT/EP2012/068169.
British Search Report dated Aug. 28, 2012, for GB 12068417.
German Search Report dated Nov. 17, 2 011, for DE 102011055443.2.
Jiang et al., "A Novel Wireless Approach for Conference Projecting and Cooperating", Lecture Notes in Computer Science, vol. 4159, pp. 688-697, 2006. (cited in GB 1206841.7 Search Report).
Martin Trautschold, iPhone 4 Made Simple, 2010, Apress, pp. 1-819.
Office Action in related U.S. Appl. No. 15/449,048, dated Feb. 16, 2018.
US Office Action dated Mar. 29, 2016, for U.S. Appl. No. 14/395,364.
Marc Al-Hames et al., Audio-Visual Processing in Meetings: Seven Questions and Current AMI Answers, 2006.
Mood indicators on electronic meeting tools IBM, IP.com No. IPCOM000011711D, Publication Date: Mar. 12, 2003.
Final Office Action in related U.S. Appl. No. 14/278,442, dated Jun. 8, 2018.
Office Action in related Chinese Application No. 201280055744.2, dated Mar. 30, 2018.
Office Action in related U.S. Appl. No. 14/344,836, dated Feb. 28, 2018.
U.S. Office Action dated Oct. 20, 2017, for U.S. Appl. No. 14/344,836.
European Notice of Opposition dated Sep. 27, 2017 for EP 2756668.
StarTech.com: USB to DVI External Dual Monitor Video Adapter/USS to VGA External Dual Monitor Video Adapter, User Manual dated May 19, 2011.
Microsoft Community, conversation on Aug. 30, 2011 about USB2VGA Adapter, retrieved on Sep. 7, 2017.
Webopedia Definition of Peripheral Device, retrieved on Sep. 7, 2017.
Trulink Wireless USB2VGA Adapter, Quick Start Guide, retrieved from www.c2g.com.
HWebPage on Availability of Trulink, retrieved on Sep. 7, 2017.
Chinese Office Action dated Oct. 31, 2017, for Cn 201280001542.X, and English translation thereof.
European Office Communication dated Jun. 15, 2015, for EP 12762258.7.
European Office Action dated Aug. 1, 2016, for EP 12762258.7.
U.S. Office Action dated Jun. 17, 2016, for U.S. Appl. No. 14/278,442.
U.S. Office Action dated Jun. 17, 2016, for U.S. Appl. No. 14/725,401.
Chinese Office Action dated Apr. 5, 2017, for CN 201280055744.2, and English translation thereof.
U.S. Office Action dated May 3, 2017, for U.S. Appl. No. 14/344,836.
Chinese Office Action dated Sep. 26, 2017, for CN 201280055744.2, and English translation thereof.
U.S. Office Action dated Sep. 28, 2017, for U.S. Appl. No. 14/278,442.
"Quick Connect Wireless with Epson Projectors", retrieved from https://www.youtube.com/watch?v=9POz4-HyDXY, Nov. 3, 2009.
"Remote Framebuffer Protocol (RFB)", Internet standard IETF RFC 6143 , Mar. 2011.
Richardson & Wood, "The RFB Protocol", Cambridge: ORL, 1998.
"Manual of the Epson projectors", retrieved from http://esupport.epsoneurope.com/ViewArticle.aspx?lng=sv-SE&kbid=328038&data=bOU002FRIftu7YFtMOBp2mpSKntPq1A26Wyw&cl=1, Feb. 14, 2011.
Chinese Office Action dated Dec. 27, 2016, for CN 201280074077.2, and English translation thereof.
Final Office Action in corresponding U.S. Appl. No. 14/725,401 dated Jan. 26, 2017.
Final Office Action in corresponding U.S. Appl. No. 14/278,442 dated Jan. 26, 2017.
Chinese Office Action in Chinese Application No. 201280074077.2, dated Jan. 4, 2018.
International Preliminary Report on Patentability (IPRP) dated Mar. 27, 2014, for PCT/EP2012/068166.
International Preliminary Report on Patentability (IPRP) dated Mar. 27, 2014, for PCT/EP2012/068167.
International Preliminary Report on Patentability (IPRP) dated Mar. 27, 2014, for PCT/EP2012/068168.
Request for Reexamination of U.S. Pat. No. 8,756,348, dated Feb. 9, 2018.
Request for Reexamination of U.S. Pat. No. 9,083,769, dated Feb. 9, 2018.
Intervention according to Art. 105 EPC in corresponding European patent 2756668, dated May 3, 2018.
Chinese Office Action dated Nov. 4, 2016, for CN 201280001542.X, and English translation thereof.
European Office Communication dated Dec. 21, 2015, for EP 12762258.7.
Chinese Office Action dated Jun. 28, 2017, for CN 201280074077.2, and English translation thereof.
Chinese Office Action dated July 4, 2017, for CN 201280055667.0, and English translation thereof.
Chinese Office Action dated Jul. 21, 2017, for CN 20128001542.X, and English translation thereof.
Chinese Office Action in corresponding Chinese Application No. 201810229467.1, dated Jan. 8, 2021.
U.S. Office Action in corresponding U.S. Appl. No. 16/852,790, dated Jan. 14, 2021.
European Office Action in corresponding European Application No. 12775162.6, dated Apr. 19, 2021.
Office Action issued in Corresponding Chinese Application No. 201810229467.1, dated Sep. 24, 2021, with English translation.

ELECTRONIC TOOL AND METHODS FOR MEETINGS

CROSS REFERENCE TO RELATED APPLICATIONS

This application is a continuation of U.S. application Ser. No. 14/725,401, filed May 29, 2015, which is a continuation of U.S. application Ser. No. 14/212,170, filed Mar. 14, 2014, granted as U.S. Pat. No. 9,083,769, which is a continuation-in-part of U.S. application Ser. No. 13/270,659, filed Oct. 11, 2011, granted as U.S. Pat. No. 8,756,348, which claims the benefit of U.S. provisional application 61/534,592, filed Sep. 14, 2011, and which is a continuation-in-part of International Application PCT/EP2012/068166, filed Sep. 14, 2012, which claims the benefit of U.S. provisional application 61/534,592, filed Sep. 14, 2011, U.S. provisional application 61/635,219, filed Apr. 18, 2012, and U.S. application Ser. No. 13/270,659, filed Oct. 11, 2011, which are all incorporated by reference.

The present invention relates to electronic tools for meetings including methods or devices for providing connection to a communications network, to networks or methods of operating the network, methods or devices for use in displaying media content as well as software for performing any of these methods.

BACKGROUND

Tools for Collaboration

Allowing ad hoc groups of persons to communicate with each other is one of the fundamental aspects of collaboration, problem solving, negotiation, teaching and education, etc. To assist in communication, there has been an explosion of electronic communication tools such as electronic conferencing tools, e.g. synchronous and asynchronous conferencing, online chat, Instant Messaging, audio conferencing, videoconferencing, data conferencing, application sharing, remote desktop sharing, electronic meeting systems, collaborative management (coordination) tools, project management systems, knowledge management systems, and social software systems.

One classic approach is the lecture or seminar often involving a presentation using presentation software. To a large extent the traditional single person presentation or lecture has been maintained with the audience being in a rather passive mode as far as determining, constructing, augmenting or modifying the information to be presented is concerned.

As with other business processes, meetings are going digital. Increasingly, people are using computer technology alone and in conjunction with broadband networks to support their meeting objectives prior to and during an actual meeting. For example, e-mail is used to pass around files for people to read prior to a meeting.

Collaborative workspaces in corporate networks and on the Internet offer geographically distributed collaborators a virtual repository for documents related to a project or a meeting. Electronic meeting support systems, such as interactive network-connected white boards and videoconferencing appliances, are available for the benefit of those who share the same room as well as those who are in remote locations.

The AMIDA Final Public Report describes the overall methodology behind the development of meeting support technologies. It reports that numerous studies confirm that meetings dominate the way people work. Namely, according to a study conducted by MCI Worldcom in 2003 a business person participates in 60 meetings per month. People meet in groups for a multitude of reasons. They interact in numerous predictable and unpredictable ways and the results of their interactions are as varied as the people who participate and the projects on which they are collaborating or communicating. Studies of business processes also reveal that approximately 80% of the "workload" associated with a project or process happens in preparation for a meeting. In other words, many people view the "live" meeting as a milestone or deadline by which they can pace and measure their productivity and that of their colleagues. Unfortunately, for many information managers, being in perpetual meetings has reduced their ability to prepare adequately for the next meeting, perpetuating a vicious and negative cycle.

However, Marc Al-Hames et al. report in "Audio-Visual Processing in Meetings: Seven Questions and Current AMI Answers", that although large parts of working days are consumed by meetings and conferences, unfortunately a lot of them are neither efficient, nor especially successful. They report a study in which people were asked to select emotion terms that they thought would be frequently experienced in a meeting. The top answer—mentioned from more than two third of the participants—was "boring"; furthermore nearly one third mentioned "annoyed" as a frequently perceived emotion.

The conclusion is that despite the plethora of electronic aids to meetings, fundamental problems in handling meetings have not been solved. In fact organising and conducting meetings in a business context involves a large number of factors.

Participation

A lack of efficiency of meetings is addressed in the article "Mood indicators on electronic meeting tools" IBM, IP.com number: IPCOMOOOOI 171 ID, Publication Date: Mar. 12, 2003. This article addresses the issue that the lack of direct feedback makes meetings clumsy, inefficient and often unproductive. It proposes a "mood indicator" as well as an "I want to ask a question" indicator which allow the presenter to choose an appropriate moment to pause, change track or field a question. It is argued that interrupting a presenter in full flow can be awkward; however, sometimes it is difficult to get an opportunity to ask a question or make a comment when many different people are trying to make their voices heard. In a similar vein, U.S. Pat. No. 6,966,035 suggests displaying a "murmur frame" for a participant to express a view. To increase user participation, US 2010/0087139 discloses a system for sending a selection to another computer, and US 2006/0095376 discloses a system for secure voting.

Commenting, voting or selecting requires that a central authority provides the information that is to be selected or commented or voted on. Hence, these proposals still leave a central figure such as the presenter in a dominating position and the other members of the meeting are largely an audience with limited selection or voting or participation rights.

A further problem with meetings is that someone is usually late or has to leave early. With the person arriving late one has to decide if the meeting is interrupted and a summary of the proceedings so far is given. For the person leaving early (often a senior person), subsequent discussions can go missing. If there is a notes taker, this provides a personal summary of the meeting—but not an objective one. Presents systems do not provide an optimal solution.

Legal And Security Issues

A legal requirement of a meeting is that presentations, comments and submissions need to be completely reproducible—in some circumstances, e.g. in a share holders' meeting, the events in the meeting should be subject to total recall. Computer-supported collaborative work technologies, particularly those which capture human verbal and non-verbal communications (audio and video interaction) in addition to text and graphics generated during a meeting, promise to have a long term impact on how people will prepare for and behave during and following meetings. In addition, connecting to a network brings the danger of virus, malware or spyware transfer in either direction, and there is danger of copying of confidential information.

Practical Difficulties

Scalability and Ease of Use

There are even more fundamental problems with using electronic tools in meetings. If two persons want to make two presentations then usually either both presentations must be placed on one machine or there is a need to swap between the presenters' machines. To bring the display content of a computer to a projector, the most common ways are to use a cable that connects the display adapter of the graphics card to the video input of the projector [method 1] or to use a software that captures the display contents and sends it over a wired or wireless network to a remote base unit connected to the projector [method 2]. This is often called "remote desktop" and is mostly used for remote administration or remote IT assistance purposes.

Less common but also practiced methods are to use a special device connected to the display adapter of the graphics card, that captures, encodes and streams the display content over a wired or wireless network [method 3]. Method 1 has several practical problems and disadvantages. In meetings where people want to contribute content from their own computers, e.g. to project images on a display, typically a video cable such as a VGA cable is used to connect each PC one at a time to the projector. This is not only not scalable but also can be and often is quite a cumbersome process that typically wastes valuable meeting time and takes the dynamism out of the meeting. Connection can be made more difficult and time consuming for example if the computer has to be rebooted for it to detect the projector or when the format of the PC differs from the format of the projector. In addition changing format can leave the computer with a new format that is not compatible with its own screen so that on reboot of the PC alone, nothing is displayed on the computer screen. Without a visible screen image the necessary re-configuration can be difficult. These issues are aggravated by a number of elements:

The use of many different video adapters, such as VGA, DVI-A, DVI-D, DVI-I, DP, HDMI, thunderbolt, . . .

Reach depends on cable length: too long leaves a tangled cable "salad" in the meeting room, too short reduces flexibility, often necessitating people to move around in the meeting room when they want to present something.

Cable connection is either point to point or requires tedious and extensive cabling and the use of complex and expensive video switches.

It is often difficult and time consuming to find the right display resolution and refresh rate that both the computer and the display or projector support.

Known technical solutions are expensive and not 100% reliable. Method 2 also has many drawbacks. If the connection is made to a corporate LAN there is a danger of virus, malware or spyware transfer in either direction, there is danger of copying of confidential information, and there is the difficulty of making the connection, e.g. entry of a user code and password, as well the administration of such passwords and user codes. In business contexts, visitors to meeting rooms typically do find technical difficulty with such means to connect to a central projector or display in the meeting room.

Additional problems can occur with firewalls and proxies. Typically a visitor to a meeting will bring a computer such as a laptop that is set up for a different corporate networking environment and hence has different or incompatible networking settings. The setting up of a firewall can be complicated and if this is not done correctly, telecommunication software that has to pass through a firewall may be blocked. In order to solve problems associated with firewalls it may be necessary to open ports or identify or even add programs in an exception list. If, besides a network (hardware) firewall and an operating system firewall, there is any software based third-party firewall like Zonealarm, CA Internet Security Suite or McAfee Firewall, then it is necessary to follow that software developers documentation to place programs on a safe list or adding exceptions to the firewall rules. Such activity is beyond the usual user. Fussing with computer settings, or having to call for IT support wastes valuable meeting time and takes the dynamism out of the meeting.

The advantage of method 3 is that the computer does not need to use its own processing power to bring the display content in a form that is easily transported over a network. This advantage becomes less relevant as computers grow in processing power. A drawback of method 3 is that the same problems often encountered with method 1 of connecting to the display adapter remain. Another drawback is that the special device referred to requires significant processing power, which means that this device will consume much power and will require a separate power supply, be relatively big and certainly be relatively expensive.

An alternative method in the making today is to use the well-known USB interface of the computer for extracting the display content of the computer. US 2009/0198839 discloses such a pluggable cable arrangement. US 2011/0115689 discloses a similar USB solution for wireless connection to a projector. Accordingly connecting a projector to a computer using the standard USB port might become commonplace with time. However, this usually requires special drivers and even special hardware in the computer. Connecting a projector to a computer using the standard USB port hence might become commonplace—but even when that happens there will be a mix of new and legacy machines for several years.

CONCLUSION

The following problems remain for holding a face-to-face meeting using advanced electronic tools at the present time:
  Complexity of the networking infrastructure.
  High demands on technical expertise of users in current systems that are supposed to be designed to support everyday use by the non-expert user.
  Barriers to the use of complicated technology in meetings.
  Great variety of possible collaborative software solutions—none of which seems to solve the fundamental problems of holding successful meetings.
  Meetings being boring or annoying for members of the meeting.
  Complexity of firewalls and other security measures employed in corporate networks.
  Lack of, or restriction of participation by members of a meeting.
  Time taken to prepare presentations for meetings.
  Need to record events in the proper time sequence at meetings without burdening a meeting more than necessary.

Although some tools solve some of these problems effectively, no electronic meeting tool solves all of them.

SUMMARY OF THE INVENTION

An object of the present invention is to provide network solutions including electronic tools for meetings as well as devices for providing connection to a communications network, to methods of operating the network, methods of displaying media content as well as software for performing any of these methods or for implementing such systems. There is also a need to capture what is actually shown or said in a meeting and not merely what might have been shown or said.

An aspect the present invention provides an electronic meeting tool for communicating arbitrary media content from users at a meeting comprising: a node configuration means adapted to operate a display node of a communications network, the display node being coupled to a first display, the node configuration means being adapted to receive user selected arbitrary media content and to control display of the user selected arbitrary media content on the first display; and at least one peripheral device adapted to communicate the user selected arbitrary media content via the communications network, wherein the peripheral device is a connection unit comprising:

(a) a connector adapted to couple to a port of a processing device having a second display, a memory and an operating system; and (b) a transmitter for communicating with the communications network, a program adapted to be loaded onto the processing device and to run on the operating system of the processing device, said program being adapted to obtain user selected arbitrary media content, said program leaving a zero footprint on termination, and an input device to allow the user to carry out a user action that triggers transfer of said user selected arbitrary media content to said transmitter through said port.

Obtaining user selected arbitrary media content is preferably not obtained by application sharing but by the process of screen scrapping, Although software packages that provide screen scraping require installation on the target device, or at least require the installation of dedicated and/or custom drivers, embodiments of the present invention use software stored on the peripheral device which allows screen scraping when run on the processing device but leaves a zero footprint when terminated. Embodiments of the present invention can screen scrape full HO videos at 20 fps without requiring any installation of a program on the processing device nor requiring configuring the processing device such as a PC that they run on for the connectivity to the network hence meeting "zero footprint" requirements.

The program adapted to be loaded onto the processing device and to run on the operating system of the processing device and being adapted to obtain user selected arbitrary media content can be stored on the peripheral device. The transmitter can be a wireless transmitter or transceiver. The peripheral device can be a plug-and-play device. The program can be adapted to screen scrape content of the second display.

The input device can be physical actuator coupled to the peripheral device. The physical actuator preferably has a surface area of between 100 and 14,400 square mm. Alternatively, the input device can be a key displayed on the second display. The key displayed on the second display can be one not screen scraped by the program.

On the peripheral device a mass storage device is provided that stores the software to be run on the processing device. The mass storage device can be logically closed once the software has been read and loaded and is running from RAM in the processing device. Also provided on the peripheral device is a further device such as an HID (human interface device) to capture user input and provide user feedback. In embodiments of the present invention, the peripheral device contains multiple internal logical devices that are combined:

An HID (human interface device) used for capturing user input (e.g. following a user action such as pressing or activating a button) and providing user feedback, e.g. by an optical indicator such as a light ring around the button e.g. an LED ring, for streaming the screen scraped video content to the network and hence to a base unit and a display,
  A mass storage device used to store the application,
  An audio device that acts as a virtual sound card to a client PC over USB, using a generic driver such as a UAC1 or UAC2 device driver.

Embodiments of the present invention are not limited to application sharing but make use of screen scraping which is able to capture all material in a neutral manner rather than being limited by proprietary applications. Further the screen scraper application is zero footprint on termination rather than being fully installed on the processing device. Embodiments of the present invention can provide arbitrary "full content" to the meeting room and participants can display in real-time, The real-time content is shown on a central display rather than being broadcast to individual participants or archived.

Embodiments of the present invention "auto compose" arbitrary user data on a central display or screen so that full real-time content that is provided by multiple meeting participants who intentionally share this content in order to make the meeting more effective and efficient, Embodiments of the present invention implement a principle of "democratic screen sharing", in which the meeting participants decide themselves on a peer-to-peer basis which content to share when and where. In particular in some embodiments a participant can obtain unilateral access to the display device, i.e. without agreement of other participants. Peer-to-peer data sharing differs from systems in which the content to be displayed is determined by a presenter or meeting director. The user determines where his content is routed to, and can do so without any software configuration on the user processing device.

Another aspect the present invention provides a method for connecting a processing device to a communications network, the processing device having a memory, a display and an operating system with at least one pre-installed generic driver providing a generic communications protocol for communication between processing device and a standard class of peripheral devices, the method comprising the steps of:
a) coupling a peripheral device to the processing device, the peripheral device having a transceiver;
b) setting up, by means of the pre-installed generic driver of the operating system, a means for communication between the peripheral device and the processing device;
c) coupling the processing device to a communications network via the peripheral device;
d) routing screen scraped data between the processing device and the communication network via the means for communication, wherein the generic communication protocol is used for transferring the screen scraped data between the processing device and the peripheral device.

The routing of the screen scraped data can be to a defined network node such as a display node without user entry of configuration details. Thus the routing can be dedicated to a specific network node such as a display node, base station etc. This is achieved by pairing of the peripheral device to the relevant node before the communication starts.

In accordance with embodiments of the present invention users start an application from the peripheral device such as a USB dangle, thus making the connection in a 3 step process: (1) connect, e.g. plug in the peripheral device to the processing device, (2) start the screen scraping application, (3) perform a user action such as click on a button on the peripheral device to go allow content to be displayed on the central screen or display. To achieve step 2 Autorun or AutoPlay can be used with some Windows operating systems, but there are many different variants based on the OS version and which patches have been installed. Furthermore, this mechanism is generally considered a security hazard, which is why most IT departments will disable Autorun/Autoplay. Other OS providers have disabled this function, e.g. Apple removed a similar functionality entirely from its OS/X since Snow Leopard. In an embodiment of the present invention a very small service—also called daemon on some OS's—is provided that requires installation on the processing device such as a laptop. This service is pre-installed on the processing device. The installation is required only once on every processing device such as a laptop. The role of this is to provide a permanently running service that continuously monitors if a peripheral device according to the present invention has been offered up for connection to the processing device. When such a peripheral device is connected, the service will detect this and start the client application software residing in the mass storage area of the peripheral device. Once the service is installed, connectivity with the peripheral device becomes a 2 step process: connect, e.g. plug in the peripheral device to the processing device, and (2) perform a user action such as click on a button on the peripheral device to allow content to be displayed on the central screen or display. The application loaded from the processing device still leaves a zero footprint on termination Step b) can comprise presenting the peripheral device to the processing device as a human interface device and wherein the pre-installed generic driver is a human interface device driver. Alternatively or additionally step b) can comprise presenting the peripheral device to the processing device as a mass storage device and wherein the pre-installed generic driver is a mass storage device driver.

Alternatively, or additionally step b) comprises presenting the peripheral device to the processing device as a composite device and wherein pre-installed generic drivers drive different device interfaces independently. A client application can be stored on the peripheral device which when run on the processing device obtains the screen scraped data. Such a client application can be a portable application and can leave a zero footprint on termination.

In another aspect the present invention provides a peripheral device for providing communication connectivity to a processing device which is provided with memory, a display and an operating system with at least one pre-installed generic driver providing a generic communication protocol for communication between the processing device and a standard class of peripheral devices, the peripheral device comprising a memory in which executable software code is stored for execution on the processing device, said executable software code comprising:
a first software code portion for setting up, by means of the pre-installed generic driver of the operating system, a means for communication between the peripheral device and the processing device;
a second software code portion for connecting the processing device to a communications network via the peripheral device, the peripheral device having a transceiver;
a third software code portion for screen scraping data from the processing device; and a fourth software code for routing screen scraped data between the processing device and the communications network over the means for communication; wherein the first software code portion is adapted to use the generic communication protocol for transferring the screen scraped data between the processing device and the peripheral device.

The first software code portion can be adapted to present the peripheral device to the processing device as a human interface device and wherein the pre-installed generic driver is a human interface device driver. The first software code portion can be adapted to present the peripheral device to the processing device as a mass storage device and wherein the pre-installed generic driver is a mass storage device driver. The first software code portion can be adapted to present the peripheral device to the processing device as a composite device and wherein pre-installed generic drivers drive different device interfaces independently.

The executable software code can comprise fifth code for providing a means for connecting to the communications network including a base node. The third code can be for providing means for capturing video frame buffers of the processing device.

The executable software code can comprise sixth code for providing a means for encoding, compressing and optionally encrypting the screen scraped data and sending the screen scraped data the communication network. The executable software code can comprise seventh code for providing a means for handling the peripheral device. The executable software code can comprise eighth code for providing means for initiating connection to the base node. The executable software code can comprise ninth code for receiving inputs from an input device on the peripheral device. The executable software code can comprise tenth code for providing a means for sending state changes to the visual indicator on the peripheral device. The executable software code can comprise eleventh code for providing a means for sending state changes to the visual indicator on the peripheral device. The executable software code can comprise twelfth code for providing a means for presenting to the user a GUI. The executable software code can comprise thirteenth code for presenting a GUI for administration of the said executable software code when executed as a portable application. The executable software code can comprise fourteenth code for providing a means for displaying and activating a key on the display of the client processing device for allowing a user to input the start the transfer of data from the processing device to the base node.

In another aspect the present invention provides a peripheral device for providing communication connectivity to a processing device which is provided with memory, a display and an operating system with at least one pre-installed generic driver providing a generic communication protocol for communication between the processing device and a standard class of peripheral devices, the peripheral device comprising a memory in which executable software code is stored for execution on the processing device, said executable software code comprising:

a first software code portion for setting up, by means of the pre-installed generic driver of the operating system, a means for communication between the peripheral device and the processing device;

a second software code portion for connecting the processing device to a communications network via the peripheral device, the peripheral device having a transceiver; and a third processing software code for routing data between the processing device and the communications network over the means for communication;

wherein the first software code portion is adapted to use the generic communication protocol for transferring the data between the processing device and the peripheral device, and an input device coupled to the peripheral device, the input device being adapted to react to a user action to trigger the transfer of the data from the processing device to the peripheral device.

The first software code portion can be adapted to present the peripheral device to the processing device as a human interface device and wherein the pre-installed generic driver is a human interface device driver. The first software code portion can be adapted to present the peripheral device to the processing device as a mass storage device and wherein the pre-installed generic driver is a mass storage device driver. The first software code portion can be adapted to present the peripheral device to the processing device as a composite device and wherein pre-installed generic drivers drive different device interfaces independently.

The input device is preferably a physical actuator coupled to the peripheral device. The physical actuator preferably has a surface area of between 100 and 14,400 square mm. The input device can be for example a key for display on the display. The executable software code can comprise fourth code for providing a means for connecting to the communications network including a base node. The executable software code can comprise fifth code for providing a means for capturing video frame buffers of the processing device. The executable software code can comprise sixth code for providing a means for encoding, compressing and optionally encrypting the video frames and sending them over a secure link to the base node. The executable software code can comprise seventh code for providing a means for handling the peripheral device. The executable software code can comprise eighth code for providing a means for initiating connection to the base node. The executable software code can comprises ninth code for receive inputs from an input device on the peripheral device. The executable software code can comprise tenth code for providing a means for sending state changes to the visual indicator on the peripheral device. The executable software code can comprise eleventh code for providing a means for presenting the user a GUI. The executable software code can comprise twelfth code for presenting GUI for administration of the executable software code when executed as a portable application. The executable software code can comprise thirteenth code for providing a means for displaying and activating a key on the display of the processing device for allowing a user input to start the transfer of data from the processing device to the base node.

In another aspect of the invention a peripheral device is provided for providing communication connectivity to a processing device which is provided with memory, a display and an operating system with at least one pre-installed generic driver providing a generic communication protocol for communication between the processing device and a standard class of peripheral devices, the peripheral device comprising a memory in which executable software code is stored for execution on the processing device, said executable software code comprising:

a first software code portion for setting up, by means of the pre-installed generic driver of the operating system, a means for communication between the peripheral device and the processing device;

a second software code portion for connecting the processing device to a communications network via the peripheral device, the peripheral device having a transceiver;

a third software code portion for receiving media content from the network and for displaying the media content on the display in accordance with a set of rules; wherein the first software code portion is adapted to use the generic communication protocol for transferring the media content between the peripheral device and the processing device.

The executable software code can comprise fourth code for providing a means for correctly configuring a receiver as an access point. The executable software code can comprise fifth code for providing a means for listening for output of connection units trying to connect on a specific port. The executable software code can comprise sixth code for providing a means for a GUI for administration purposes. The executable software code can comprise seventh code for providing a means for publishing its presence over the network using the zeroconf protocol. The executable software code can comprise eighth code for providing a means for accepting and installing software updates. The executable software code can comprise ninth code for providing a means for providing facilities for pairing of connection units to the processing device. The executable software code can comprise tenth code for providing a means for auto-composing of different incoming arbitrary media streams and rendering of composited image on display. The executable software code can comprise eleventh code for providing a means for receiving, decrypting and decoding incoming arbitrary media content. The executable software code can comprise twelfth code for scaling of incoming arbitrary media streams. The executable software code can comprise thirteenth code for providing a means for displaying incoming arbitrary media content in accordance with a set of rules. The present invention also provides a method for communicating arbitrary media content from users at a meeting comprising:

operating a display node of a communications network, the display node being coupled to a first display, to receive user selected arbitrary media content and to control display of the user selected arbitrary media content on the first display; and connecting a peripheral device to a port of a processing device and communicating the user selected arbitrary media content via the communications network, loading a program onto the processing device and running the program on the operating system of the processing device to obtain user selected arbitrary media content, said program leaving a zero footprint on termination, and triggering transfer of said user selected arbitrary media content to said transmitter through said port after a user action on an input device. The present invention also provides a peripheral device comprising:

a base a connector for connection to a plug and play port of a host processing device, a flexible connection between the base and the connector for transferring data signals and power, an actuator on the base for actuating a signal and for transferring the signal to the connector for transfer to the port, wherein the base has electronics comprising permanent storage for storing a portable application, a processing engine, a transceiver and a visual indicator. The present invention also provides a method for providing communication connectivity from a processing device, setting up a communications network between a base node of the communications network and a peripheral device coupled to the processing device;

transferring media content between the processing device and the peripheral device, transmitting the media content from the peripheral device to the communications network, receiving media content from the communications network at the base node and displaying the media content on a display in accordance with a set of rules.

Any of the above software code stored on a non-transitory storage medium.

Definitions

The term "unilateral electronic access to the display device" by a participant, means that the displaying process is obtained by the act ion of only one participant involved in the meeting, without requiring the agreement of another or the others. The term "unilateral" implies that the data for display is allowed to override or replace any data displayed on the screen by the same or another participant of the meeting.

"Plug and play" is a term used to describe the characteristic of a computer bus, or device specification, which facilitates the discovery of a hardware component in a system, without the need for physical device configuration, or user intervention in resolving resource conflicts. Plug and play devices can be added to a bus of a computing system (while running or when shut down), and the newly added device and possibly the rest of the computing system is automatically configured to make the newly added device work, both from hardware and from software perspective. Plug and play interfaces include for example (not an exhaustive list): Firewire (IEEE-1394), PCI, Mini PCI, PCI Express, Mini PCI Express, PCMCIA, PC Card, Universal Serial Bus (USB), SDIO cards.

"Auto-configuration" is the automatic configuration of devices without manual intervention, without setting any switches or jumpers, and without any need for software configuration. An example of auto-configuring devices: USB devices.

Examples of auto-configuring protocols: DHCP, Zeroconf, Bonjour. A plug and play device has auto-configuration software by default to make it plug and play. Example: USB devices are made to be plug and play by including the correct auto-configuration software (e.g. host driver, host stack, application software).

Autoconfiguration can also refer to a software alone and is not restricted to a physical device. "Hot swapping and hot plugging" are terms used to describe the functions of replacing computer system components without shutting down the system. More specifically, hot swapping describes replacing components without significant interruption to the system, while hot plugging describes the addition of components that would expand the system without significant interruption to the operation of the system. A well-known example of this functionality is the Universal Serial Bus (USB) that allows users to add or remove peripheral components such as a mouse, keyboard, or printer. Other examples are eSATA, PCIe, Fire Wire, for example.

A "portable application" (portable app), sometimes also called standalone, is a computer software program designed to run without installation on the target machine. This type of application is stored on a removable storage device such as a CD, USB flash drive, flash card, or floppy disk—storing its program files, configuration information and data on the storage medium alone. It is a program that can be stored on an electronic device such as a USB flash drive, iPod, memory card, portable hard drive or other portable electronic device and runs on a computer or other processing device coupled to the electronic device without making permanent configuration changes to the host computer. All such programs have a zero-footprint, meaning all temporary files, registry entries, and any other changes to the machine exist only while the program is running.

To be considered a portable application, for purpose of this invention, a software program must:

Not require any kind of formal installation onto a computer's permanent storage device to be executed, and can be stored on a removable storage device such as USB flash drive, iPod, memory card, portable hard drive or other portable electronic storage device thus enabling it to be used on multiple computers.

Settings are stored with, and can be preferably carried around with, the software (i.e., they are written to the electronic device such as a USB drive). Settings are not stored to the registry or any other central system database of the computer.

Leaves a zero (or near-zero) "footprint" on any PC it is run on after being used, i.e., all temporary files/registry settings should be either avoided or at least removed once the program has exited, and files created by the user can be saved directly to the same removable media as the application is stored on.

A portable application does not leave its files or settings on the host computer on which it runs. For example, the application does not write to the Windows registry or store its configuration files (such as an INI file) in the user's profile; instead, it stores its configuration files in the program's directory. Another requirement, since file paths will often differ on changing computers due to variation in Windows drive letter assignments, is the need for applications to store them in a relative format. Preferably, such a program does not require a launcher program to copy necessary settings and files to the host computer when the application starts and move them back to the application's directory when it closes as this may leave a residue on the hard drive in case of power failure.

"Electronic meeting systems" (EMS) need to be distinguished on the one hand from classic groupware, on the other from web conferencing systems. In reality, there is some overlap between minor features of products of the named categories. The main difference from groupware is the intensity of collaboration. EMS should be distinguished from systems with which it is possible to show the contents of an individual computer screen on a remote display with multiple users at the same time.

"Groupware" supports collaboration within groups where the individual contributions remain identifiable. In contrast, EMS enable the group to cooperatively produce a result for which the group is responsible as a whole. In a business process, groupware and electronic meeting systems complement each other: Groupware supports teams when researching and creating documents in the run up to an EMS session or when implementing the results of such a session. "Web conferencing systems" and "electronic meeting systems" complement each other in the online meeting or workshop: EMS extends the web conferencing system by providing interactive tools for producing and documenting group results. On the other hand, "web conferencing systems" complement EMS with the screen sharing and voice conferencing functionality required in synchronous online meetings and not present in EMS.

"Data conferencing" refers to a communication session among two or more participants sharing computer data in real time. Interaction and presentation devices such as a screen, keyboard, mouse, camera, etc. can be shared. It is a term used to distinguish from video conferencing and audio conferencing. The data can include screen, documents, graphics, drawings and applications that can be seen by the participants of the meeting.

"Application sharing" is an element of remote access, falling under the collaborative software umbrella, that enables two or more users to access a shared application or document from their respective computers simultaneously in real time. Generally, the shared application or document will be running on a host computer, and remote access to the shared content will be provided to other users by the host user. Application sharing should be distinguished from systems in which collaboration on the applications between different users is not possible but the contents of individual computer screens can be projected onto a remote display with multiple users at the same time.

The term "arbitrary media content" refers to the fact that a user may generate, create or select any media content that is appropriate to display, i.e. on an ad hoc basis. This differs from client voting on, or selecting of media content that is displayed by another in a meeting or presentation. This term refers to client oriented, distributed rights and privileges for the display of content rather than a central presenter providing content which is presented to the members of the meeting.

"Screen scraping" in our sense refers to reading the video frame buffers and processing them, rather than just rendering them on a display. Screen scraping for presentations is described in LJS2002/0196378 to Slobodin et al which is included herein by reference.

"Auto composition" or "auto layout" refers to the automatic nature in which multiple graphics/video sources are rendered on a central display, without user intervention and in a way that a user would intuitively expect it to happen.

"Wireless" and "wireless communication network" can be any network that does not use cable links between nodes, e.g. uses RF, optical or InfraRed for communication purposes, such as IrDA, diffuse infra-red, WLAN, WiMax, WiFi, WiFi Direct, Bluetooth or any other wireless communication network known to the person skilled in the art such as optical networks like LiFi.

"Computer" generally refers to a processing device, i.e. having a processing engine capable of various types of digital processing, such as rendering graphics images for display. A computer can be in the form of a work station, a personal computer, a laptop, a palm top, a PDA, a smartphone, a tablet etc. Generally a computer has memory such as volatile RAM, Non-volatile memory such as a hard disc, optical disk or solid state memory can be included in the computer or can be a peripheral device. Currently most computers are electronic but the term "computer" also includes optics based computing devices.

The term "pre-installed generic driver" is intended to mean a driver which is installed on a processing device such as a computer as a standard driver, e.g. is installed with the installation of the operating system. Such a driver is standard for the operating system and can drive a standard class of peripheral devices coupled to or connected to the processing device. The installation of a specific driver for such a peripheral device is not required. Such a generic driver can be a human interface driver (HID) or a mass storage device driver, which has predetermined software components configured for driving mass storage, a CD-ROM, a keyboard etc. or combinations of these. Such devices can be readable and writable computer peripheral memory devices such as USB memory sticks, flash memories, external hard drives, or more. Brief

DESCRIPTIONS OF THE DRAWINGS

DETAILED DESCRIPTION OF THE EMBODIMENTS OF THE PRESENT INVENTION

Figure 1A:
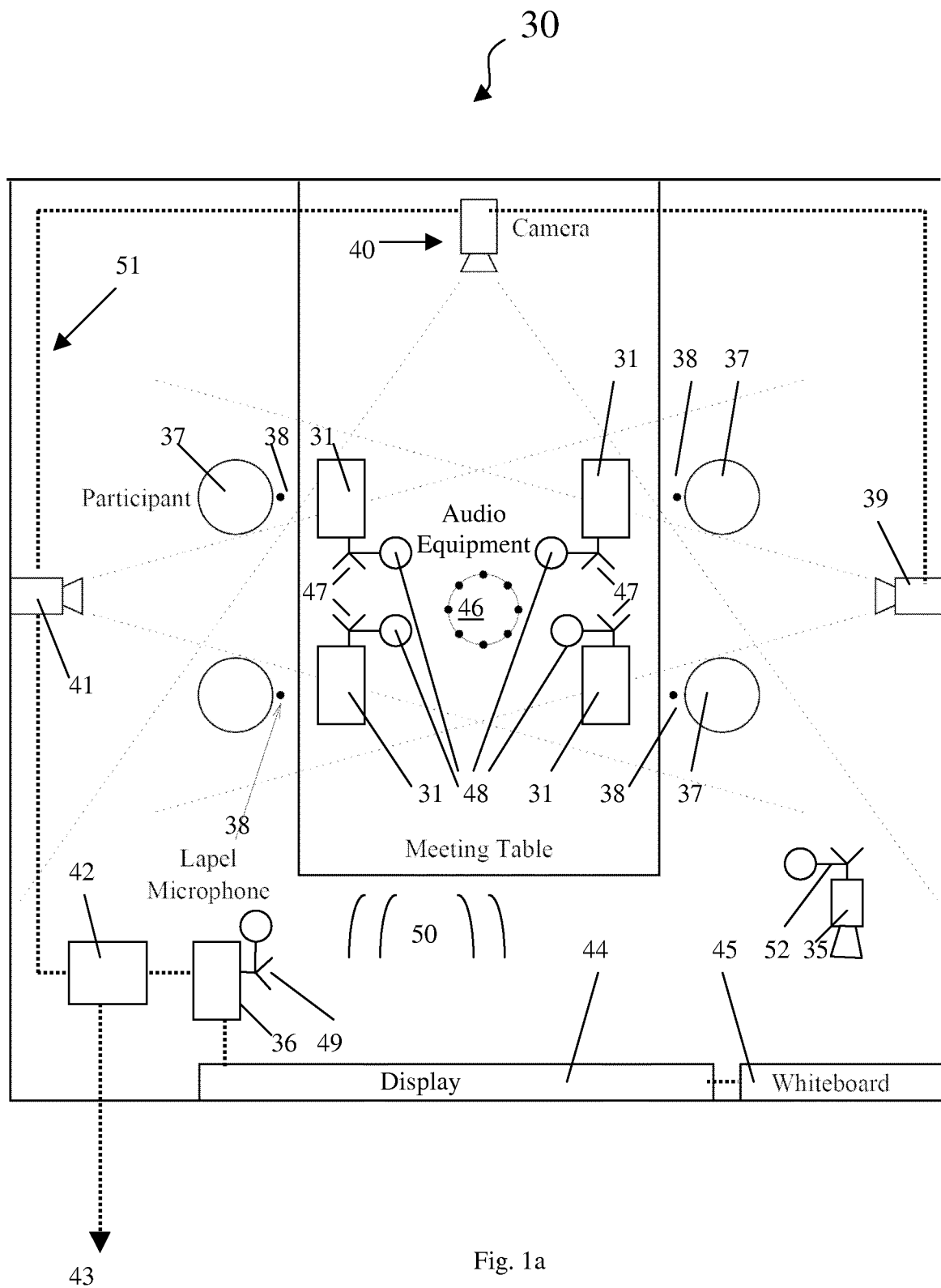
FIG. 1a shows a meeting room that can be used with embodiments of the present invention.

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein. Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware. References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

Embodiments of the present invention provide solutions to three major problems with meetings:
a) the time taken to prepare for a meeting. This is mainly achieved by allowing "on-the-fly" presentation of any displayable information. This information does not have to be linked into any particular presentation software, nor to be compatible with any such presentation software,
b) the time taken to conduct the meeting using electronic meeting tools. This is achieved by reducing the time to connect computers to the display or projection system.
c) the time taken to reflect and review and document the meeting afterwards.

This is achieved by providing the possibility of recording the course of the meeting in the same time sequence that it was carried out as well as be able to store all data presented and who presented it.

First Embodiment

FIG. 1a is a schematic representation of a generic meeting room 30 with a meeting table that can be used with embodiments of the present invention. Participants 37 having some form of processing device 31 such as a laptop computer, a tablet, a PDA etc. Each of the processing devices 31 can be a host device and has a first connection unit 47 to which it is coupled. The first connection unit 47 provides access to a network 50 which in this case is a wireless network, but could be a wired network. The network can be a shared resource network. Each connection unit 47 may be coupled to an input device 48 which will be described in more detail later. A user 37 will typically at a distance from the processing device 37 which is ergonomically satisfactory. This ergonomic boundary is typically an area of about 1000 sq cm to 4000 sq cm. This ergonomic boundary will typically have the user as one side of the boundary and the comfortable reach of the arms will determine an area on the left and right of the processing device which falls within the ergonomic boundary and the far edge of the boundary of the processing device (normally delimited by a display screen) will determine the other side of the ergonomic boundary. The area defined by the ergonomic boundary will overlap or include the processing device 31 itself. The processing device will also have an outer physical boundary. The input device 48 is preferably arranged to operate outside the boundary of the processing device 31 but within the ergonomic boundary. Preferably the input device is arranged to function when it is flat on the table. The input device preferably has an size of activation area of between 1 and 144 square cm. In other embodiments of the present invention a wireless memory card can be provided to enable a second Wi-Fi link on a processing device such as a laptop or tablet. The wireless memory card stores data and media and fits into the laptop just like a regular SDHC card. The wireless memory card preferably has built-in Wi-Fi that effortlessly transfers data, photos and videos to another device or computer. For instance an Eye-Fi card (www.eye.fi) can be used to enable the latter, Preferably the network 50 is a local area network, (e.g. a shared resources network) i.e. preferably local to the meeting room for security reasons but the network 50 may have access to other local or wide area networks such as 51 or to a larger corporate network or the internet 43, for example via a router 42. Another node of the network 50 is the base or display node 36. This node 36 may optionally be a wireless access point. The base node 36 may also be a processing device or host computer and may be coupled to a second connection unit 49 that provides access to the network 50 thus linking all of the processing devices 31, 36 together. The connection unit may have an input device as described above. Alternatively, network connections installed on the base node 36 can be used. Audio equipment 46 may be provided, e.g. a telephone that allows other members of the meeting to call in from remote destinations.

The display node 36 is coupled to and adapted to allow display of media on some kind of display 44. The display node is in embodiments of the present invention a base node of the communications network 50. The display 44 may be a projector and/or screen, the projector being coupled to the base node 36. A whiteboard 45 can optionally be provided that can be optionally coupled to the display 44 and/or the base node 36, e.g. when the whiteboard can record electronically what is written on it. Optionally, a camera 35 may be provided to record the entries on the whiteboard 45. The camera 35 may have a third connection unit 52 for connecting the camera 35 to the network 50 so that the data from the whiteboard can be recorded and stored or transmitted to other networks via router 42. The connection unit 52 may have an input device 53 as described above for the connection unit 47.

Optional equipment can be cameras 39, 40, 41 for recording the progress of the meeting. These cameras can be linked by a network 51, e.g. a cable network to the router 42 and/or the base node 36. Another optional item is a microphone or microphones 38 that can be used to transfer audio, e.g. to the processing devices 31 and to loud speakers (not shown) attached to the base node 36 or part of the display 44.

Any or all of the outputs of the processing devices 31, the cameras, the whiteboard, etc. can be recorded and stored digitally, e.g. in node 36 or elsewhere to provide a complete record with correct time sequence. Summarising the above, the present invention provides an electronic meeting tool for communicating arbitrary media content between different users 37 (with their own processing devices 31, e.g. PC, mobile phone, or tablet) and one display or projector or multiple displays or projectors 44 in the meeting room 30.

Figure 1B:
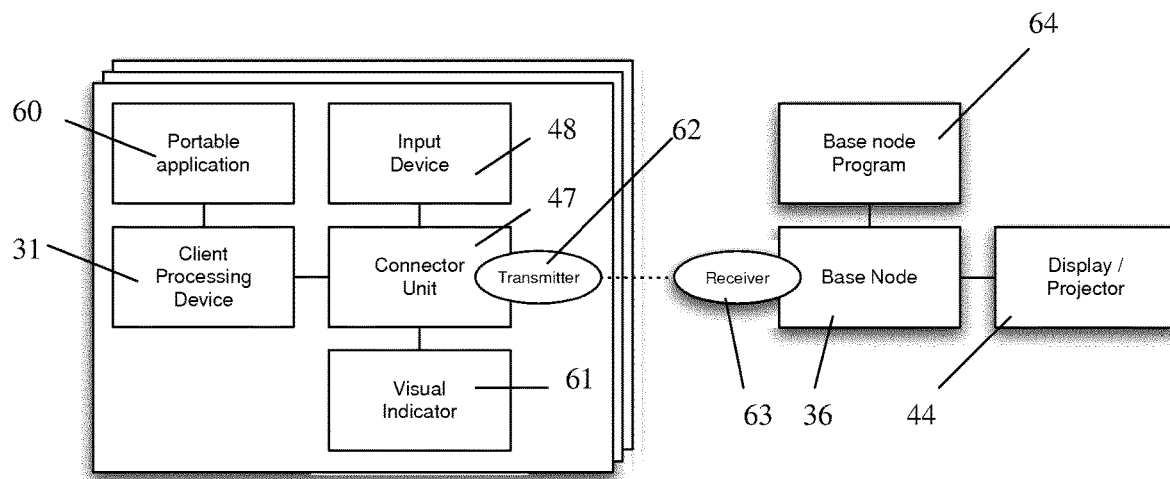
FIG. 1b shows a combination of a client processing device, a connection unit, a base node and a display in accordance with an embodiment of the present invention.

Referring to FIGS. 1a and 1b embodiments of the present invention comprise a base or display node 36 being a processing device, e.g. a host computer adapted to receive user selected arbitrary media content, the base node 36 being coupled to a central display 44 which can be a fixed format display and/or a projector or similar. The arbitrary media content can be provided from any of the user processing devices 31. The base node 36 can be adapted to display the received user selected arbitrary media content in accordance with a set of rules, e.g. FIFO, automatically, on request or approval, forced to display, in accordance with a priority etc. Optionally the base node 36 is adapted to force display of the received user selected arbitrary media content, i.e. to allow participation in the meeting by an individual user displaying own selected content on display 44 independently of the person who is nominally responsible for giving a presentation or chairing the meeting. Forcing the display can also be considered as a rule. The phrase "unilateral electronic access to the display device" defines this kind of rule as "unilateral" means that the displaying process is obtained by the act ion of only one participant involved in the meeting, without requiring the agreement o another or the others. The term "unilateral" implies that the data for display is allowed to override or replace any data displayed on the screen by the same or another participant of the meeting. The meeting tool can also be adapted to allow a priority setting. This means that a user can set a priority setting for the media to be displayed, A priority of "1" for example can be interpreted by the base node as a forced display, a priority "2" can be interpreted by the base node as display as soon as possible, priority "3" can be interpreted by the base node as place in queue and display as the time comes etc. Setting and using priorities for display are also considered to be working to rules. To execute the rules, the base node 36 may have a decision module. The base node 36 may be a host computer having a processing engine such as a microprocessor and a memory. Preferably, the base node 36 is adapted to treat media content passed to the base node 36 from any or all of the connection units 47 in an equal manner. The base node 36 may be adapted to auto compose the media content on the central display 44 connected to it, e.g. from one or more processing devices 31.

An independent aspect of the present invention is at least one connection unit 47, (optionally 49 for receiving or camera connection unit 52) adapted to communicate the user selected arbitrary media content to said base node 36. Preferably the connection units 47 and/or optionally 49 are physical plug-and-play devices. An example of a connection unit is shown schematically in FIG. 10.

The connection unit 47 (or optionally connection unit 52) may be integrated into a user processing device 31, e.g. as an internal peripheral device or may preferably be an external peripheral device comprising a connector adapted to couple to a port of a user processing device 31. The processing device 31 may have a client display, a processing engine such as a microprocessor, a memory and an operating system. The optional connection unit 49 may integrated into the base node 36, e.g. as an internal peripheral device or may be an external peripheral device comprising a connector adapted to couple to a port of the base node 36. The connection unit 49 may be fully integrated into the base node 36, e.g. is an internal network interface of the base node 36. The base node 36 may have a processing engine such as a microprocessor, a memory and an operating system.

In alternative embodiments of the present invention, the peripheral device can be coupled wirelessly to the processing device, and paired with the processing device such as a tablet or laptop through Near-Field Communication (NFC). In other embodiments of the present invention, the pairing of the peripheral device can be performed additionally by providing means for receiving biometric data such as a microphone (voice) or a camera (face or iris) or a finger swipe (fingerprint) to the peripheral device. Then the peripheral device can be personalized, or paired, by means of voice or face recognition, respectively. The term voice recognition refers to finding the identity of "who" is speaking, rather than what they are saying. Recognizing the speaker by voice recognition can simplify the task of translating speech in systems that have been trained on specific person's voices or it can be used to authenticate or verify the identity of a speaker as part of a security process. "Voice recognition" means "recognizing by voice", something humans do all the time over the phone. As soon as someone familiar says "hello" the listener can identify them by the sound of their voice alone.

The user processing devices 31, the connection units 47, (optionally 49, 52) and the base node 36 co-operate to form a communication network 50 for linking between at least one of the plurality of processing devices 31, 36, 35 and the central display device 44. The communication network 50 is adapted to receive arbitrary media content from at least one of the plurality of processing devices 31 and to transmit the arbitrary media content of at least one of the plurality of processing devices to the central display device 44.

In some embodiments the storage means of the peripheral device can be adapted to record or share information. For instance, the peripheral device can be adapted to further comprise a private communication channel (e.g. to enable chatting), which can communication with a private communication channel of another participant of the meeting.

An independent aspect of the present invention is a portable application 60 adapted to be loaded onto a client processing device 31 and to be run on the operating system of the client processing device 31. The portable application 60 runs as a process on the client processing device 31 that is adapted to deliver an arbitrary media content from the client processing device 31 to the communication network 50 in response to a user action applied to an input device 48, the process leaving a zero footprint on the processing device 31 on termination. The network 50 can be a shared resource network. Optionally the portable application 60 is stored on each connection unit 47 and optionally 49. Preferably the portable application 60 is adapted to "screen scrape" content of the client display of the client processing device 31.

Optionally the portable application 60 when run on a processing device 31 is adapted to "screen scrape" content of the client display of this client processing device 31 and to transmit it via a connection unit 47. Optionally the portable application 60 when run on the processing device is adapted to "screen scrape" content of the client display of the client processing device 31 and to transmit it via a network interface of the processing device 31, for example if the connection unit 47 has no transmitter or it is not functioning.

The connection unit 47 for communicating with said base node 36 has a network interface e.g. comprising a transmitter 62. The transmitter 62 is preferably a transceiver. Optionally the transmitter/receiver can be a wireless transmitter/receiver.

The base node 36 for communicating with the connection unit 47 has a receiver 63 which can be included in the connection unit 49 or integrated into the base node 36. The receiver is preferably a transceiver. Optionally the transmitter/receiver can be a wireless transmitter/receiver.

The input device 48 allows a user interaction with the connection unit 47. Preferably the input device 48 is physical actuator coupled to the connection unit 47. The user action applied to the input device 48 generates a signal that can trigger transfer of data from the processing device 31 (to which the connection unit 47 is coupled) to the network 50. Preferably the input device 48 has an activating surface that is between 100 and 14,00 square mm. Optionally the input device 48 can be a key displayed on the client display 1 of a client processing device 31. This key can be activated, e.g. by use of a pointing device such as a mouse trigger transfer of data from the processing device 31 to the network 50.

The connection unit 47 is preferably provided with a visual indicator 61, e.g. for allowing user feedback from the connection unit 47 of the status of any activity. The system also can include a server program 64 adapted to be loaded onto the base node 36, said program 64 being adapted to receive arbitrary media content from one or a plurality of client processing devices 31 through said connection units 47, (optionally 49), and to show this plurality of arbitrary media content streams on one or a plurality of displays 44. The server program 64 may be adapted to allow display in accordance with one or more rules, e.g. FIFO, automatically, on request, forced, in accordance with a priority etc. The forcing rule can be described as "unilateral electronic access to the display device" as "unilateral" means that the displaying process is obtained by the action of only one participant involved in the meeting, without requiring the agreement of another or the others. The term "unilateral" implies that the data for display is allowed to override or replace any data displayed on the screen by the same or another participant of the meeting. To execute the rules, the server program 64 may have a decision module. Preferably, the server program 64 is adapted to treat media content passed to it from any or all of the connection units 47, 52 in an equal manner. The server program 64 may be adapted to auto compose the media content on the central display 44.

The server program 64 may be a portable application adapted to be loaded onto the base node 36 and to be run on the operating system of the base node 36. The portable application 64 runs a process on the base node 36 that is adapted to display an arbitrary media content received from the client processing device 31 via the communication network 50, the process leaving a zero footprint on the base node 36 on termination. Optionally the portable application 64 is stored on each connection unit 49 and optionally 47 and can be installed therefrom.

Meetings in which visual information is presented on a display or projector commonly suffer from a monopoly effect: one single presenter determines the display contents and thereby has a disproportionate power to influence the meeting dynamics and thereby its outcome. Embodiments of the present invention solve this problem by allowing multiple individuals to simultaneously show their information. The present invention provides according to some embodiments a method to override all currently displayed material. In a sense the method of the present invention transforms visual communication into something akin to talking, i.e. full-duplex and with the option to shout and interrupt.

The system may also include a central display device 44 and optionally a whiteboard 45 or other display means such as a printer. The display 44 being adapted to receive user selected arbitrary media content, and may be adapted to allow display of the received user selected arbitrary media content in accordance with one or more rules, e.g. FIFO, automatic, forced, on request or approval, in accordance with a priority etc. The forcing rule can be described as "unilateral electronic access to the display device" as "unilateral" means that the displaying process is obtained by the action of only one participant involved in the meeting, without requiring the agreement of another or the others. The term "unilateral" implies that the data for display is allowed to override or replace any data displayed on the screen by the same or another participant of the meeting.

Optionally, one of the connection units 47 can be adapted to be a master connection unit. Such a master connection unit may be adapted to instruct the base node when media content from a client processing device 31 may be displayed or which of the processing devices may be allowed to send content for display.

In embodiments of the present invention, at least one portable application is used, e.g. for the client software on a client processing device 31 or optionally on the base node 36. In these embodiments, one of the pre-installed generic drivers of the operating system on the relevant computer device 31, 36 is exploited for setting up communication from the computer device 31, 36 to the network 50 via the connection unit 47, (optionally 49). The generic driver is used in connection with the connection unit 47, (optionally 49) operating as a peripheral device but the use can go beyond that of the standard class of peripheral devices for which the generic driver is intended. In some embodiments the connection unit 47, (optionally 49) operated as a peripheral device communicates with the relevant processing device 31, 36 by using a generic communication protocol provided by the pre-installed generic driver.

Pre-installed USB drivers are examples.

Preferably the setting up of the communication of network 50 using connection unit 47, (optionally 49) does not alter or affect the networking capability of the relevant processing device 31, 36. For example, if a browser is started on the client processing device 31, this browser can use the standard network interfaces on the processing device 31. This means that transfer of data via the connection unit 47 (optionally 49) is independent of transfer of data over the network interfaces of processing device 31 or 36. This has the advantage that each user can carry out processing such as searching on the internet to gather data independently of the transfer of data to be displayed during a meeting, or receive emails etc.

The use of a portable application has the advantage that any modification to settings in the register or generally in the operating system can be avoided, so that upon any form of termination, e.g. disconnecting the electronic device, system crash, no trace is left. This is generally termed "zero footprint".

The present invention has the advantage of scalability. It can provide a display system for use by a plurality of users in meetings. Every user in the meeting thus can have a client processing device 31 for coupling to a connection unit 47. A first user action connects the client processing device 31 to the base node 36, e.g. by inserting a connection unit 47 into the relevant interface connector on the processing device 31, e.g. a USB interface. A second user action comprising activating a button or key on the input device (e.g. by depressing it) then starts the process of transmitting arbitrary media content from the client processing device 31 to the base node 36. This process preferably includes screen scraping data from the processing device. Using screen scraping avoids special programs being installed on the base node 36 to carry out graphical commands sent from the processing device 31. When the base node 36 receives the plurality of arbitrary media content, it can allow auto composition of this media content on the central display connected to it.

In some embodiments, the button or key can be virtual button which is displayed on the screen instead of a button or key on the input device, which for instance can be the peripheral device. Preferably, when the process of transmitting arbitrary media content has been activated, the screen scraping data from the processing device does not scrape the virtual button. The latter can be enable for instance by positioning the virtual button on a second layer which is not scraped.

The present invention will now be described further with reference to certain more specific embodiments.

The present invention in some embodiments provides a system and/or a method to which in one aspect can override all currently displayed material when arbitrary material is presented on a display device from more than one source processing devices such as a laptop, PDA, smartphone, computer, tablet etc. The present invention in one aspect controls the display of visual communication and information by a method akin to talking, i.e. full-duplex and with the option to interrupt or to obtain unilateral electronic access to a display device.

One embodiment the present invention can be implemented through a connectable peripheral device e.g. a USB compatible device, such that when the peripheral device is connected to a processing device that is used to provide arbitrary information such as text, video, pictures etc., each individual user with a processing device can to gain access to the display, e.g. screen. By being present at the meeting a user can pair the peripheral device to a processing device by inserting the peripheral device. The user can also pair the peripheral device to a base node or base unit that controls the display in the meeting room and which is connectable to the peripheral device via a communications network such as a wired or wireless communications network. The network is a shared resources communications network as different devices and participants can transmit data over the network. To achieve this, the peripheral device has a transceiver capable of transmitting the arbitrary data from the processing device to the display via the base node. In one option the information displayed on the local display of the processing device is screen scraped and transmitted. To allow this the peripheral device can include a portable application that is able to execute on the processing device leaving a zero-footprint on termination. Although a physically connectable peripheral device is convenient, the peripheral device could also be coupled to the processing device via a wireless connection, e.g. via the Bluetooth protocol. For meetings with remote participants it is not possible to rely on the same hardware connectable peripheral device to provide access from a remote location to the display in the meeting room directly. Typically, at home or in a hotel, the participant only has a phone and internet access on a laptop or some other kind of portable computing device. Remote participants lack context (e.g. non-verbal communications) and have less than ideal audio/video connections and consequently suffer from a power-asymmetry. Typically, remote participants also have no way of 'pushing' their contents on screen, since the meeting is controlled by a meeting organiser or director who orchestrates the sequence of presentations. One of the key advantages of the present invention is to provide remote collaboration while maintaining a kind of 'situational awareness'. This means that what you see has a straightforward relationship with your internal mental map. This allows keeping track of multiple information flows and being able to correlate that quickly with any other information, e.g. with a search carried out on the local computing device.

In another aspect of the present invention confusion and frustration is avoided by:

1. retaining aspect ratio of any image that is sent from any location to the display in the meeting room or displays in meeting rooms (e.g. a long thing remains a long thing)
2. not overlapping images and/or windows on any of the display devices in the meeting rooms (e.g. you never have to guess or remember what's hidden)
3. showing the same arrangement of images on each screen (everyone sees the same things and can refer to them), this means that the topological arrangement of images on each screen of multiple screens is the same,
4. maximizing the use of screen real-estate (e.g. the images presented do not have borders containing no useful information), while preferably no allowing overlapping of the images
5. allowing local manipulation of zoom and pan but allowing to return to the default layout of item 3 above
6. arranging the images on each display taking into account the local display characteristics, such as any of resolution, pixel density, aspect ratio,
7. optionally also allowing an ongoing audio connection to be heard by all participants, e.g. that verbal communications will be used to alter the contents of the screen.

Figure 2:
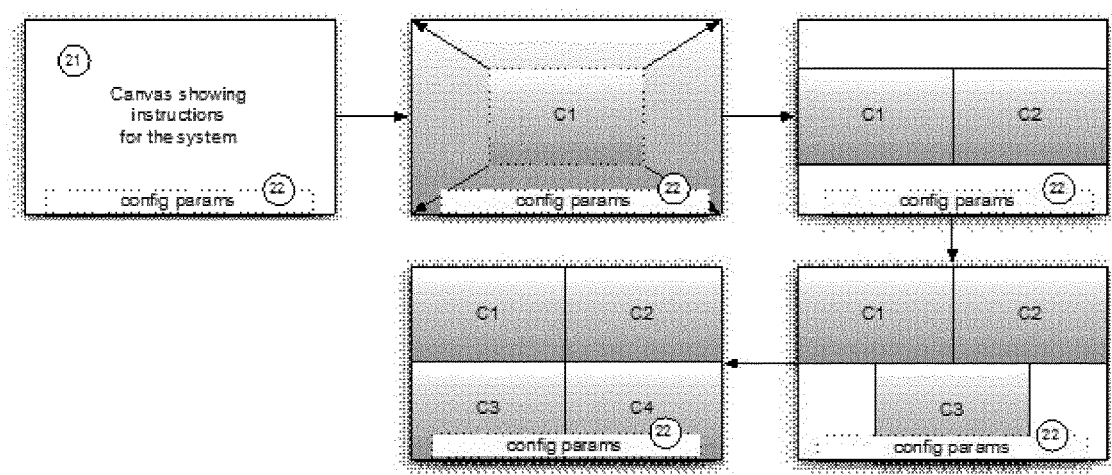
FIG. 2 shows a screen display in accordance with an embodiment of the present invention.
Figure 3:
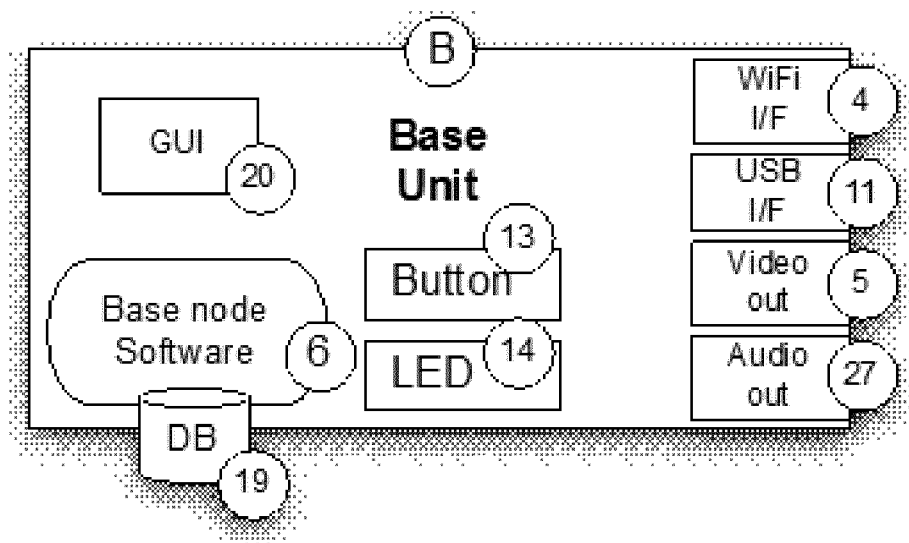
FIGS. 3 to 5 show a base node and a peripheral device and a client processing device in accordance with embodiments of the present invention.
Figure 4:
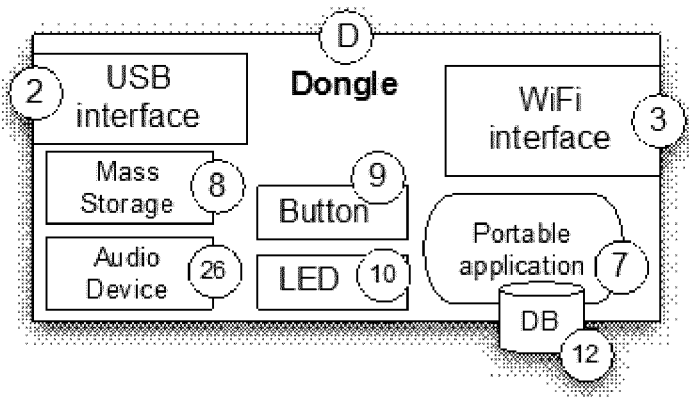

With reference to FIG. 2, the base node software (6) running on a base node 36 can be adapted to display on the central display a splash screen (21) showing its readiness to receive arbitrary media content over its receiver. This splash screen (21) can also show instructions on how to use the system, as well as the configuration parameters (see later) to reach the base node 36. These configuration parameters are also shown in a transparent canvas at the bottom of the central display (22).

A client processing device 31 that wants to have its arbitrary media content displayed on the central display connected to the base node 36 is connected to a connection unit 47. The portable application 60 will be executed on the client processing device 31 as a host device. A first user interaction creates a connection between the portable application 60 and the base node 36 using the transmitter in the connection unit 47 and the receiver in the base node 36. This user action can be a connection of the connection unit 47 to the processing device 31. A second user interaction, this time on the input device 48, activates screen scraping by the portable application of the arbitrary media content from the client processing device display, which is then sent over the connector unit 47 to the base node.

The base node 36 receives the plurality of arbitrary media content coming from one or more connection units 47, and auto composes this media content for rendering on the central display.

The visual indicator 61 on the connection unit 47 indicates to the user and to other participants in the meeting that media content is being sent by that connection unit 47 to the base node 36 for display, Repeating the second user interaction on the input device 48 of a connection unit 47 decouples the media content from that connection unit 47 from the base node 36. The base node 36 removes that media content from the composed image on the central display and recomposes the remaining content on the central display. The content on the central display/projector is auto arranged as shown in FIG. 2. When user 1 adds content, his/her display will be scaled to fill the available central display canvas as much as possible, but without affecting the aspect ratio. When user 2 adds in, his content is added to the side of the first image. When user 3 adds his content, the arrangement is a suitable one such as triangle wise. Adding user 4, the image becomes a 2 by 2 tiling, which is the maximum available. When an additional user attempts to add content, he will be blocked. When a user initiates action to remove his/her content, his/her media content is removed from the central display and one moves backward in the composition sequence shown in FIG. 2.

Base Node Software

The base node software has one or more of the following features:

First code for providing a means or a method step for correctly configuring the receiver of the base node. Second code for providing a means or a method step for listening for output of connection units trying to connect on a specific port.

Optionally, third code for providing a means or a method step for a GUI for administration purposes, offered for example over a web interface.

Optionally, fourth code for providing a means or a method step for publishing its presence over the network using the zeroconf protocol.

Optionally, fifth code for providing a means or a method step for accepting and installing software updates of the base node as well as for the portable application software for the connection units.

Sixth code for providing a means or a method step for providing facilities for pairing of connection units to the base node, Seventh code for providing a means or a method step for auto-composing of different incoming arbitrary media streams and rendering of composited image on display or projector screen.

Eighth code for providing a means or a method step for receiving, decrypting and decoding incoming arbitrary media content.

Optionally ninth code for providing a means or a method step for scaling of incoming arbitrary media streams Optionally tenth code for providing a means for displaying incoming arbitrary media content in accordance with a set of one or more rules.

Any of the above code may be stored on a non-transitory machine readable storage medium such as an optical disk, a magnetic disk, magnetic tape, solid state memory, USB mass storage device etc.

Portable Application for the Client Processing Device

The portable application comprises an algorithm for screen scraping. Screen scraping algorithms include VNC and RDP or similar. The algorithm may include a combination of algorithms such as VNC and RDP that are optimized for different content, e.g. static text or video. The portable application has one or more of the following features:

Eleventh code for providing a means or a method step for connecting to a network including the base node.

Twelfth code for providing a means or a method step for capturing video frame buffers of the client processing device, i.e. computer (C), also called screen scraping.

Thirteenth code for providing a means or a method step for encoding, compressing and optionally encrypting these video frames and sending them over a secure link to the base node. Only changed areas such as rectangles or triangles of the screen (or any other suitable geometrical shape) need to be transferred, and different types of rectangles or triangles are encoded in different ways (e.g. RLE, JPEG, . . . ) to optimise performance.

Fourteenth code for providing a means or a method step for handling the connection unit, Fifteenth code for providing a means or a method step for initiating connection to base node.

Sixteenth code for receive inputs from the input device on the connection unit.

Seventeenth code for providing a means or a method step for sending state changes to the visual indicator on the connection unit.

Optionally, eighteenth code for providing a means or a method step for presenting the user a GUI (18).

Optionally, nineteenth code for presenting GUI for administration of the portable application.

Optionally, twentieth code for providing a means or a method step for displaying and activating a key on the display of the client processing device for allowing a user input to start the transfer of data from the client device to the base node.

Embodiments of the present invention provide a frame grabber. A frame grabber, known in the prior art, is an electronic device that captures individual, digital still frames from an analog video signal or a digital video stream. It is usually employed as a component of a computer vision system, in which video frames are captured in digital form and then displayed, stored or transmitted in raw or compressed digital form. In recent years, connections via USB, Ethernet and IEEE 1394 ("Fire Wire") interfaces have become prevalent. The frame grabber of the present invention, enables HDMI or Display Port capture instead via USB. The frame grabber preferably functions as follows:

Connect to the base unit using a TCP/IP socket interface.

Capture the video frame buffers of the computer,

Encode, compress and encrypt these video frames and stream them over a secure link to the base unit. Only changed rectangles of the screen are transferred, and different types of rectangles are encoded in different ways (e.g. RLE, JPEG, . . . )

Present the user a GUI

Any of the above code may be stored on a non-transitory machine readable storage medium such as an optical disk, a magnetic disk, magnetic tape, solid state memory, NAND Flash, etc, In this embodiment the portable application stored on the connection unit, and is executed in an execution context on the client processing device. The portable application does not need to be copied to or installed on the computer. It can be executed directly from the connection unit. It will only be copied temporarily into an execution context on the client processing device. There are also no changes in configuration required or settings in the client processing device. This means that nothing will remain on the client processing device when the connection unit is removed. It also implies that the portable application will run on client processing devices where the user does not have the necessary access rights to install software.

The portable application is designed in such a way that
No specific drivers need to be installed on the client processing device.
Pre-installed drivers are used, e.g. for classes of peripheral devices,
It is independent from vendor specific graphics hardware.
It runs on at least one and preferably on a variety of different client processing devices, including Windows, Mac OS/X, Linux, Android, iOS and many others.

Advantages

The present application has one or more of the following advantages:
No need for a master role in the meeting
Standard plug and play connectivity of connection units to base node
Simple and well known user actions are employed
Own networking facilities of client processing devices not blocked
No configuration changes on the client processing device
Input devices are easily accessible; e.g. large size
Program updates of portable application and server program can be performed locally
Portable applications are used, no installation, multi-platform, no vendor specifics
Particular implementation of screen scraping done by portable application avoids vendor specific graphics devices
Standard drivers are used so no need to install extra drivers
No configuration changes on the client processing devices
Zero footprint applications on client processing devices— nothing to clear up or adjust or reset
Own networking facilities of client processing devices not blocked—No configuration changes on the user computers
Low virus, malware and spyware risk The portable application may be stored on a non-transitory machine readable storage medium such as an optical disk, a magnetic disk, magnetic tape, solid state memory, nand Flash etc.

Second Embodiment

In the second embodiment, referring to FIGS. 2 to 5, the base node is a separate physical processing device called base unit (B), comprising permanent storage, memory, a processing engine, a wireless access point (4), a plug and play interface such as a USB port (11), a graphics display output adapter (5) like VGA/DP/DVI/HDMI, and optionally an audio output adapter (27). An input device having an actuator such as a button 13 and a visual indicator 14 are optional.

The connection unit is a physical device in the form of an external peripheral device (shown in the drawings as a "dangle" 0) comprising permanent storage storing the portable application (7) and configuration parameters (12), memory, a processing engine (e.g. CPU, FPGA), a wireless transmitter such as WiFi (3) or other wireless transmitters such as LiFi, a plug and play interface such as a USB interface (2), a button as input device (9), an LED ring as visual indicator (10). The portable application is stored on the peripheral device (7). The client processing device is host device, for example a computer or laptop comprising a display, a plug and play interface such as a USB port (2), memory, and a processing engine such as a microprocessor.

The system thus comprises:
an external peripheral device (D) that has a plug and play interface such as a USB interface (2) on one end and a communications interface such as a wireless interface configured as client (3) on the other end.
a base unit (B) that has a communications interface such as a wireless interface configured as access point on one end (4) and a video card adapter (5) like VGA, DVI, DP or HDMI on the other end.
a portable application (7) stored on the peripheral device (D) but executed on the client processing device (C)
a base node software (6) stored and executed on the base unit (B)

The external peripheral device (D) also preferably has any one or any combination of:
a large button as actuator for the input device (9) allowing user interaction with the peripheral device. The button preferably has an actuation surface area of between 100 and 14,400 square mm.
visual indication such as a LED (10) allowing user feedback from the peripheral device. The user feedback can be in the form of a light ring.

An advantage of embodiments of the present invention is to provide data transfer to the peripheral device via a peripheral interface such as a USB interface on any processing device such as a computer in a manner that is largely operating system independent and without leaving a footprint (Zero-Footprint). Installation of drivers and/or applications onto such a processing device as a computer is not necessary wherever pre-installed generic drivers are present. Administrator rights on the processing device such as a computer are preferably not necessary. To avoid the need for administrator rights, embodiments of the present invention use other peripheral device pre-installed drivers such as USB class drivers supported without any extra installation. Embodiments of the present invention route at least screen scraped data presented by client software running on the processing device for transfer to a communications network via a peripheral device such as a USB device. This bypasses any network interface of the processing device C (and hence many firewalls) but only for the specific client software. Other applications are not affected and can make use of the standard network interfaces, i.e. packets from/to the TCP/IP stack are transferred to a network device as normal. The client software is launched from the peripheral device such as a USB composite device or storage device as a portable application, which can avoid that any traces are left on the host OS.

Basic Usage Scenario Of The Second Embodiment

Figure 5:
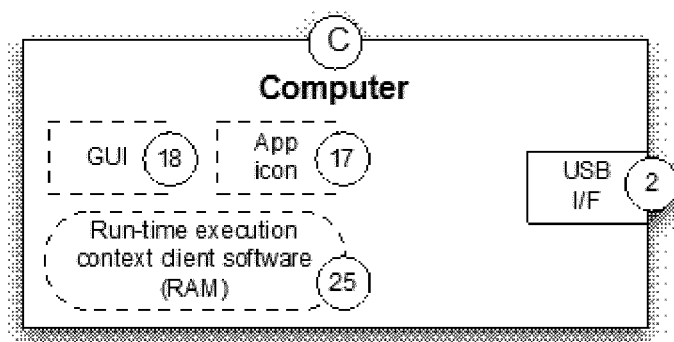

The base node software (6) displays on the projector a splash screen—(21) in FIG. 5—showing its readiness to receive arbitrary media content over its receiver (4). This splash screen (21) also shows instructions on how to use the system, as well as the configuration parameters (see later) to reach the base node. These configuration parameters can also be shown in a transparent canvas at the bottom of the central display (22).

To avoid user interaction for the configuration of the connection between peripheral device and base unit, a pairing process is used. This pairing process provides the peripheral device, i.e. the connection unit with networks parameters needed to set up the local network. As an example, the peripheral device can be briefly plugged into the USB port (11) of the base unit (B). The base unit then optionally does a software validity check, optionally does a software update of the portable application stored on the peripheral device, and writes the connection parameters on the peripheral device (D) required for the peripheral device and base unit to find each other to the permanent storage (8). For example, when using WiFi, this could be the SSID, WEP/WPA2 keys and IP address and port number of the base unit's receiver, as well as the port number used by the base node software, but not all of these are necessarily needed to be exchanged.

A client processing device that wants to have its arbitrary media content displayed on the central display connected to the base node (5) connects a peripheral device (D) to its USB port via (2). The peripheral device presents itself to the computer over interface (2) as a composite device comprising a mass storage device and a keypad. This has the major advantage that no specific driver is required, since all these devices are natively supported in every personal computer system that has a USB port. If autorun is enabled, then the computer will automatically execute the client software (7) stored in mass storage (8) on the peripheral device. The first user interaction mentioned in the general case is then just the connection of the peripheral device to the USB port. If security measures disabled auto-run, the user needs to explore the mass storage on the mass storage of the peripheral device and start the portable application manually.

The portable application Mill use the wireless, e.g. WiFi or LiFi interface of the peripheral device (3) to connect to the correct base node. To know the right base unit to connect to, the configuration parameters needed to make this connection are stored in the database (12) on the mass storage device (8) during the pairing process described earlier.

Once the connection is made, the peripheral device goes into connected mode. This means that there is now at least one channel from the peripheral device to the base unit. The content is not shown yet. The LED (10) on the peripheral device now turns white to give a visual indication of this new state.

Figure 6:
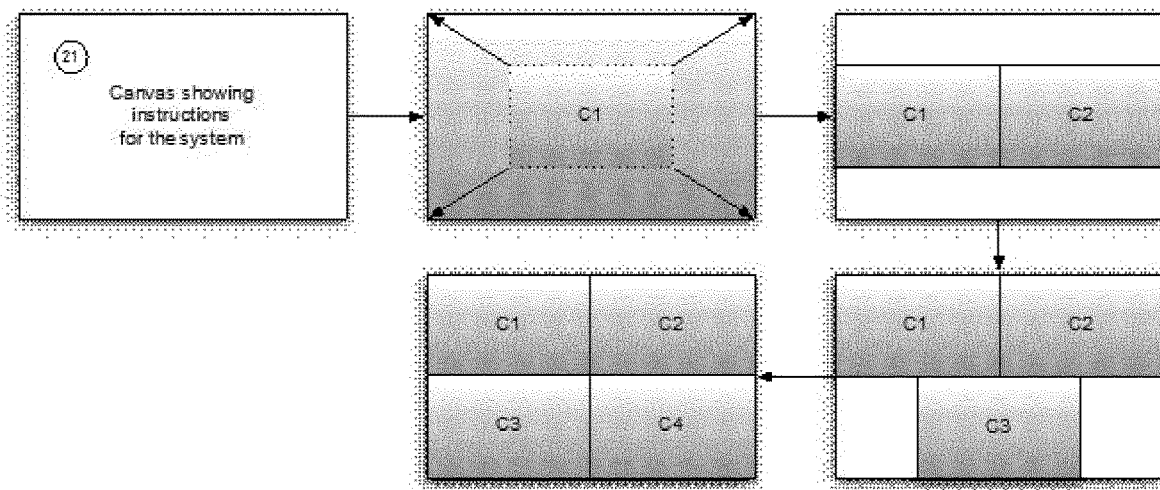
FIG. 6 shows a display in accordance with an embodiment of the present invention.

When the user at the computer (C) wants to show her content, she presses the button (9). When the button was previously in state "connected" (see FIG. 6), it will check the state of the base unit (P). If the base unit is not in state "full", the peripheral device will send the screen scraped arbitrary media content to the base unit (B), which will add the media content to the composition on the central display. The peripheral device LED (10) now turns red to indicate "showing" state (FIG. 6).

The button (9) acts as a toggle. When the user presses the button again, that computer displays content will be removed from the projector. The LED (10) goes back to white.

Use of the auto-run feature is optional if possible and enabled on the computer (C) to start the client software (7) as soon as the peripheral device is plugged in. On Windows for example, this means mounting the peripheral device as a mass storage device and using the autorun.inf file stored on the peripheral device.

In many cases however, this auto-run feature will be disabled for security reasons. In that case, we will, if possible and enabled on the computer (C), use the auto-play feature to show the logo of the connected peripheral device on the desktop of the computer. The user then needs to double click on that logo to start the client software. If the auto-play feature as described above is also not possible or enabled, the user must browse to the file system of the connected peripheral device and start the application manually. This means double clicking the client.exe file on Windows, client. app on Mac OS/X or tapping the appropriate application icon on a tablet or any mobile device with touch screen.

Third Embodiment

Portable application stored on standard solid state memory such as a USB stick.

Figure 7:
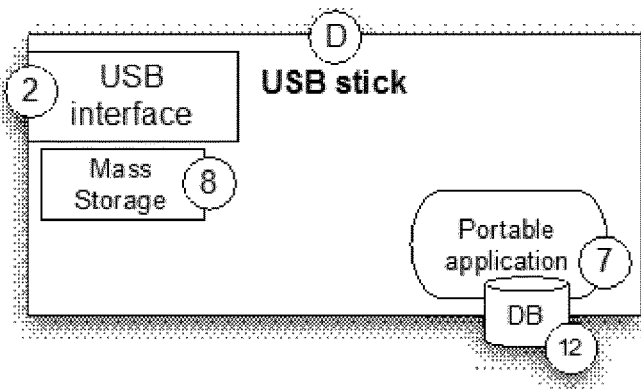
FIG. 7 shows a peripheral device in accordance with an embodiment of the present invention.

In the third embodiment, the portable application is stored on a solid state memory such as a regular USB memory stick (FIG. 7).

With a solid state memory such as a regular USB memory stick, there is no input device, visual indicator or transmitter of the kinds described above for the connection unit. This means that the system needs to:

Use the transmitter/receiver from the client processing device.

Use as input device a key or button on the client processing device like a physical key on the keyboard, a special mouse press, a button area on a touch screen, a button displayed on the screen to be clicked on with a mouse pointer.

Present the visual indicator on the client processing device's display.

Figure 8:
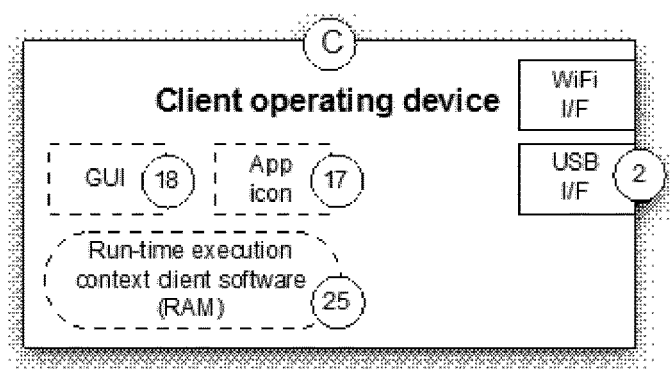
FIG. 8 shows a client processing device in accordance with an embodiment of the present invention.

The client processing device then looks like FIG. 8.

This embodiment provides a peripheral interface such as the USB interface on any processing device acting as a host device such as a computer in a manner that is largely operating system independent. Installation of drivers and/or applications onto such a processing device as a computer is not necessary wherever pre-installed generic drivers are present. Administrator rights on the processing device such as a computer are preferably not necessary. To avoid the need for administrator rights, this embodiment uses other peripheral device pre-installed drivers such as USB class drivers supported without any extra installation. This embodiment of the present invention routes at least screen scraped data presented by client software running on the processing device for transfer to a communications network via a network connection of the processing device. The client software is launched from the peripheral device such as the USB device as a portable application.

The first user operation then comprises:

plugging in the solid state device such as a USB memory stick, starting the portable application (if autorun is disabled)

configuring the transmitter, such as the wired or wireless network interface, on the client processing device to connect to the correct base node, using the configuration parameters (22) shown on the central display triggering the connection of the portable application with the base node, for example by interacting with an element on the GUI (18) of the portable application presented on the display of the client processing device.

Presenting visual feedback on user actions is in this embodiment also done using elements in the GUI of the display of the client operating device.

In this embodiment, the advantage of zero footprint is partly realized by the portable application in the sense that no software is installed on or copied to the client operating device, but there is a configuration change needed to connect the transmitter of the client operating device with the base node, which needs to be undone afterwards.

Optionally, the portable application can make the configuration changes to the transmitter for the user in the background.

Advantages lost in this embodiment
Partial loss of zero footprint nature of portable application
More complex first user interaction
More expertise required from user
GUI needed on client operating device display, which is possibly also shown on central display
Need to find free key on client operating device when using physical key for second user action
Network interface is blocked from other uses by portable application Optionally, the last point can be avoided by using the base unit as a gateway to the network that the client operating device wanted to connect to through its own interface.

Advantages are:
tight control of user connectivity to corporate network through settings on the base unit
keep network connectivity intact even when transmitter is now also used for display purposes Disadvantage is a higher vulnerability of the system because the display connection is now possible a doorway into the corporate network.

Figure 9:
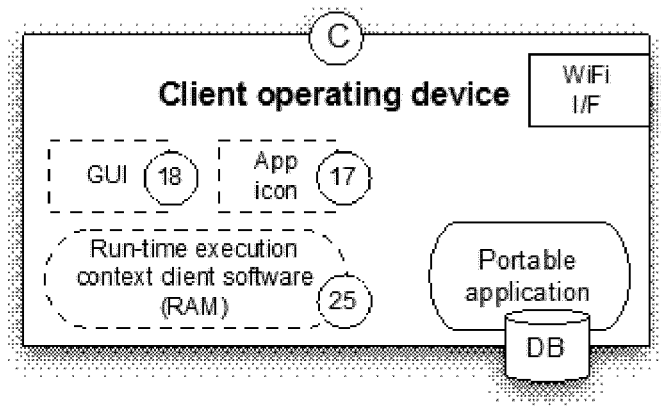
FIG. 9 shows a further client processing device in accordance with an embodiment of the present invention.

What remains as advantages are
the availability of a physical medium to distribute the portable application to users—no need to install or copy software to client operating device
easy way to maintain software updates on the connection units (here: memory sticks) via the base unit
possibility to write configuration data on the connection unit by the base unit, for example in the form of a configuration profile that can be read and used by the client operating device Fourth Embodiment: Software Only Client Installed on the Client Processing Device This embodiment is similar to the third embodiment, with as only difference that the software is copied on the client operating device (FIG. 9). In this case, no plug and play port such as a USB port is required on the client operating device.

This embodiment will typically be used for tablet PC's and mobile devices. In that case
there is often no USB port available
application distribution is easy and widely accepted through application stores Fifth Embodiment: Base Node Software OEM'ed to Projector or Display Equipment In this embodiment, the base node is not realized as a separate physical box, but integrated into the processing unit inside a display or projector. All other details are as previously described.

Sixth Embodiment

In this embodiment, the base node is not realized as a separate physical box, but integrated into the codec of a video conferencing equipment. All other details are as previously described.

Seventh Embodiment: Remote Meeting Participant

In this embodiment, one or multiple client operating devices are not in the direct vicinity of the base node but on a remote location. To accommodate this case, the following adaptations are needed:
further compression and or scaling of the arbitrary media content o allow use of low bandwidth connection
possibility to communicate connection parameters of the base node to a remote user
connectivity of the base node to the WAN network to which the remote user is connected
All other details are as previously described.

Eighth Embodiment: Multiple Base Nodes

In this embodiment, multiple base nodes are used. This can be done for different purposes:
connectivity of multiple central displays
extension of real estate of central display
connectivity of base nodes in different remote locations This provides the advantage that one can present on multiple base units from a single peripheral device. This is useful for a number of cases:
personal peripheral device: user can have a personal peripheral device that is paired with multiple meeting rooms that he regularly uses
use in meeting room with multiple base units each controlling a different display in the same meeting room The proposal uses a special variant of the peripheral device called a multi base peripheral device. The multi base peripheral device is equipped with a rotating wheel around the circular central "show me" button. This could be a mechanical rotating multi-position switch or something like the touch wheel on the iPod classic.

Figure 10:
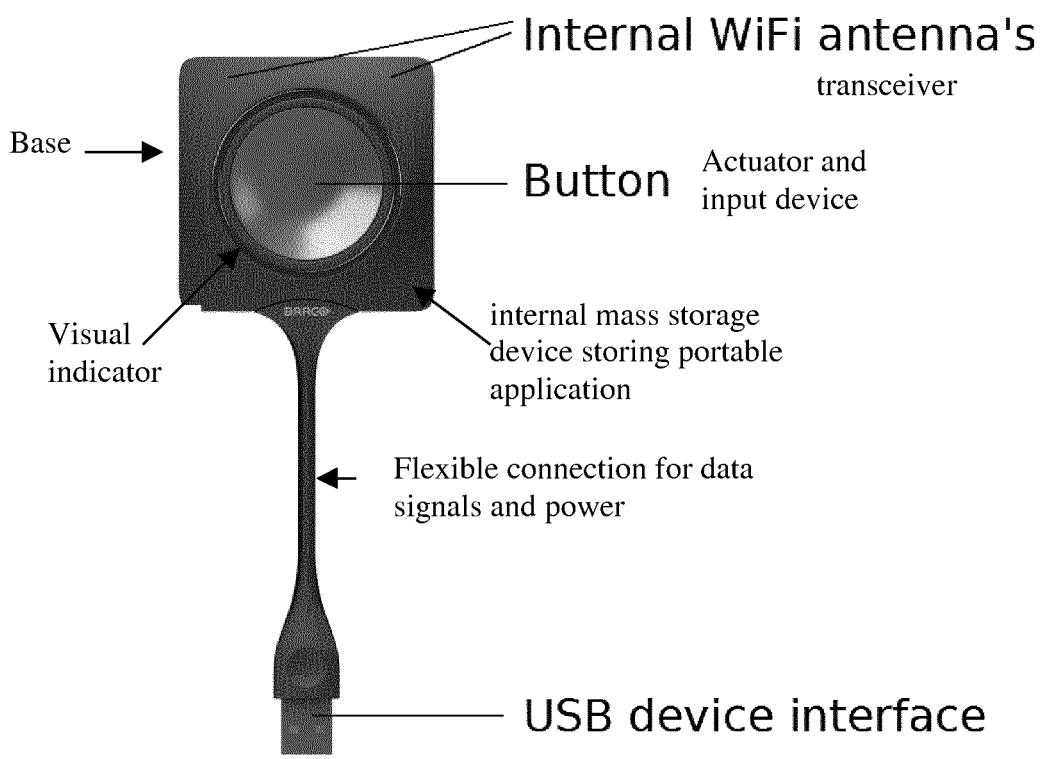
FIG. 10 shows an embodiment of a peripheral device in accordance with an embodiment of the present invention.

The pairing of this multi-base variant of the peripheral device:
the rotation wheel is put in the position of the corresponding base unit.
the peripheral device is paired to the base node in the regular way
the configuration parameters are stored in a permanent storage location; every position of the rotating wheel has a corresponding set of connection parameters (e.g. different rows in a table) each corresponding with a particular base The connection of the peripheral device is as follows:
multi-base peripheral device X is plugged into a PC
rotation wheel on peripheral device X is put in position A
peripheral device X reads configuration parameters in position A of its internal memory
peripheral device X connects to base node A
base node A indicates connection of multi-base peripheral device X on central display screen
rotation wheel on peripheral device X is put in position B
peripheral device X reads configuration parameters in position B of its internal memory
peripheral device X connects to base node B
base node B indicates connection of multi-base peripheral device X on screen
continue until correct base is selected with rotation wheel
click the peripheral device input device e.g. button to show content on central display of base node
rotating the wheel always first clicks away content from the base of the last position Ninth Embodiment FIG. 10 shows a peripheral device 47 in accordance with an independent embodiment of the present invention including an input device. This embodiment can be used with any of the embodiments described above. The peripheral device is configured as a connection unit and is a physical device in the form of a connector for a plug and play interface of a user processing device as a host computer such as a USB connection, a flexible data and power connection connected to the connector and a base, the base having an actuator, e.g. a button configured to be an input device with the functions as described above.

The base and/or the actuator is preferably large in size, e.g. having a surface area between 100 and 14,400 square mm. The base can be square, rectangular, round, hexagonal, oval, polygonal in shape or any other ergonomically suitable shape. The actuator is preferably round but can be square, rectangular, hexagonal, oval, polygonal in shape etc. there can be more than one actuator on one base.

The length of the flexible data and power connection, e.g. cable is preferably adapted to place the peripheral device (when in its connected in its operating position), especially the base and the actuator, in the region between the boundary of the connected user processing device and the ergonomic boundary as defined above. In addition the flexible data and power connection should be adapted so that the base lies flat on the meeting table independent of the orientation of the connector needed to insert the connector into the plug and play interface.

The base preferably includes electronics such as having permanent storage for storing the portable application and the network configuration parameters, memory, a processing engine (e.g. CPU, FPGA), a wireless transmitter/receiver such as for WiFi or LiFi, a plug and play interface such as a USB interface, a LED ring as visual indicator. The visual indicator can be used for the LiFi interface. The portable application can be stored on the peripheral device, i.e. in the base. The visual indicator is for allowing user feedback from the connection unit of the status of any activity.

Some examples for activation of the actuator which can be used with any of the embodiments of the present invention:
  Sound activated (hand clap, voice recognition, computer sound, music, . . . )
  Remote controlled via wireless connected device (IR, Bluetooth, WiFi, . . . )
  Light activated
  Pressure activated, e.g. depression with a finger or hand,
  Touch activated
  Proximity ('near-touch' on the actuator or bringing the actuator close to some object
  Biometric reader such as Fingerprint reader, Iris scanner. DNA analyser
  Keypad, e.g. for entering Keycode e.g. a password

Alternative Embodiments

In the above embodiments, once the connection is made between the connection device and a host computer, the peripheral device goes into connected mode. This means that there is at least one channel from the peripheral device to the base node. In accordance with any of the embodiments of the present invention a plurality of channels can be set up between the connection device and the base node. These channels may be logical channels.

Some examples for such a multichannel arrangement may include the first and one or more of the additional channels:

First channel is for the Scraped image stream (XDS)
Second channel is for GPU commands (OpenGL, DirectX)
Third channel is for Mouse pointer coordinates (absolute, relative)
Fourth channel is for Mouse pointer icons
Fifth channel is for Image data files (JPEG, PNG, GIF, . . . )
Sixth channel is for Multimedia data files or streams (MPEG2, MPEG4, OGG, H.26x, . . . )
Seventh channel is for Audio data files or streams (MP3, MP4, AAC, WMA, . . . )
Eighth channel is for text or Document data files (DOC, DOCX, PPT, PPTX, ODT, ODS, PDF, . . . )
Ninth channel is for transmission of a priority value 1,2, 3 . . . as described above.

In the above embodiments, a particular method of pairing the peripheral device with the base node has been described. Any of the embodiments of the present invention may include other pairing mechanisms of which some examples are given below.
Some examples for pairing
Plug in the peripheral device, to a generic peripheral device port such as a USB port of the base node or other USB enabled device. Pairing info is transmitted over the generic peripheral interface such as USB.
The Signal strength of the wireless channel to the base node is used to identity which base nod is to be used
The Signal strength of the wireless channel or any other channel. Example is an NFC/RFID transmitter can be provided underneath the meeting room table.
Putting the user processing device such as a laptop and the peripheral device plugged in on this table automatically pairs the peripheral device with the base of this meeting room
Manual pairing (e.g. by entering IP address, hostname, wireless ID (like SSID on WiFi)).

The invention claimed is:

1. A method for connecting one or more processing devices, each processing device being a user device of one participant in a meeting with a plurality of participants, to a wireless communications network having a base node with one or more first displays, the one or more processing devices each having a memory, a second display and an operating system with at least one pre-installed generic driver providing a generic communications protocol for communication between the processing device and a class of peripheral devices, the method comprising the following steps for each processing device:
  a) coupling a peripheral device to the processing device, the peripheral device having a wireless transceiver;
  b) setting up, by means of the pre-installed generic driver of the operating system, a means for communication between the peripheral device and the processing device;
  c) coupling the processing device to the wireless communications network via the peripheral device; running a client application stored on the peripheral device to obtain screen scraped data;
  d) routing the screen scraped data between the processing device and the wireless communications network via the means for communication for display on the one or more first displays of the base node, wherein the generic communication protocol is used for transferring the screen scraped data for display between the processing device and the peripheral device; and e) obtaining electronic access to the one or more first displays for display of the screen scraped data;

the method further comprising:

displaying the screen scraped data on the one or more first displays in accordance with a set of rules, one of the rules being a forcing rule, wherein the forcing rule is that display on the one or more first displays of new screen scraped data is obtained by the action of only one participant involved in the meeting, without requiring the agreement of another participant, the new screen scraped data of any participant for display overrides or replaces any data displayed on the one or more first displays from the same or another participant of the meeting.

2. The method of claim 1 further comprising loading a server program onto the base node, the server program receiving screen scraped data from one or a plurality of client processing devices, and displaying the screen scraped data on one or more first displays, the server program allowing display in accordance with one or more rules of which one is a forcing rule, wherein the forcing rule is that the display on the one or more first displays is obtained by the action of only one participant involved in the meeting, without requiring the agreement of another participant, new screen scraped data of any participant for display overrides or replaces any data displayed on the one or more first displays from the same or another participant of the meeting.

3. The method of claim 2, wherein the server program is a portable application adapted to be loaded onto the base node and to be run on an operating system of the base node.

4. The method of claim 1, wherein the peripheral device has an actuator, the method further comprising a user action on the actuator that triggers transfer of the data for display from the processing device to the wireless transceiver and from there to the wireless communications network.

5. The method of claim 1, wherein step b) is selected from:

presenting the peripheral device to the processing device as a human interface device and wherein the pre-installed generic driver is a human interface device driver;

presenting the peripheral device to the processing device as a mass storage device and wherein the pre-installed generic driver is a mass storage device driver; and presenting the peripheral device to the processing device as a composite device and wherein pre-installed generic drivers drive different device interfaces independently.

6. The method of claim 1, wherein the peripheral device comprises:

a base, a connector, and a flexible connection between the base and the connector for transferring data signals and power, and wherein the actuator is on the base and the base has electronics comprising a processing engine, a transceiver and a visual indicator, the method further comprising:

connecting the connector to a plug and play port of the processing device and actuating a signal with the actuator and transferring the signal to the connector for transfer to the port.

7. The method of claim 6, wherein the peripheral device comprises permanent storage for storing the client application.

8. The method of claim 1, wherein the transferring of the data for display is to a defined network node without user entry of configuration details.

9. The method of claim 8 for use by a plurality of users in a meeting, there being client processing devices each for coupling to a peripheral device for every user in the meeting, a first user action connecting a processing device to the base node, and a second user action comprising activating an actuator located on an input device coupled to the peripheral device which then starts a process of obtaining the data for display by screen scraping data from the processing device and transmitting screen scraped data to the base node, the base node carrying out graphical commands sent from the processing device.

10. The method of claim 8, wherein, when the base node receives the screen scraped data, further comprising the step of providing auto composition of the screen scraped data on the first display connected to the base node.

11. The method of claim 7, further comprising pairing of the peripheral device to the base node before communication starts.

12. The method of claim 7, wherein a daemon is provided that is pre-installed on the processing device, the daemon providing a permanently running service that continuously monitors if a peripheral device has been offered up for connection to the processing device.

13. The method of claim 7, wherein the pre-installed generic drivers drive different device interfaces independently.

14. A method for providing communication connectivity from a processing device, the processing device being a user device of a participant in a meeting with a plurality of participants, the method comprising the following steps:

setting up a communications network between a base node of the communications network and a peripheral device coupled to the processing device;

transferring media content between the processing device and the peripheral device; the media content being screen scraped data from a screen of the processing device;

transmitting the media content from the peripheral device to the communications network;

receiving media content from the communications network at the base node and displaying the media content on a display in accordance with a set of rules, one of the rules being a forcing rule, whereby the forcing rule determines that the displaying of media content on the display is obtained by a user action on any one of the user devices involved in the meeting, without requiring the agreement of another participant, the media content from the any one of the user devices overriding or replacing any data displayed on the display by the same or another participant of the meeting.

15. The method of claim 14, wherein the base node has one or more displays, further comprising loading a server program onto the base node, the server program receiving screen scraped data from one or a plurality of client processing devices, and displaying the screen scraped data on the one or more displays, the server program allowing display in accordance with one or more rules of which one is the forcing rule, wherein the forcing rule is that the display on the one or more displays is obtained by the action of only one participant involved in the meeting, without requiring the agreement of another participant, new screen scraped data of any participant for display overrides or replaces any data displayed on the one or more displays from the same or another participant of the meeting.

16. An electronic meeting tool for communicating arbitrary media content, being data for display, from users at a meeting, the tool comprising:

a base unit of a wireless communications network, the base unit being coupled to one or more first displays, the base unit being adapted to receive user selected arbitrary media content from a processing device via the wireless communications network, and to control display of the user selected arbitrary media content on the one or more first displays;

at least one peripheral device adapted to communicate the user selected arbitrary media content from the processing device to the base unit via the wireless communications network;

a program adapted to be loaded onto the processing device and to run on an operating system of the processing device, said program being adapted to obtain user selected arbitrary media content from the processing device;

an input device to allow the user to carry out a user action that triggers transfer of said user selected arbitrary media content from said processing device to a transmitter and to the wireless communications network, the input device being an actuator coupled to the peripheral device and the base unit is adapted to display said user selected arbitrary media content on the first display in accordance with a set of rules, wherein one of the rules is a forcing rule, whereby the forcing rule is that the display on the one or more first displays is obtained by the action of only one participant involved in the meeting, without requiring the agreement of another participant, the data of any participant for display overriding or replacing any data displayed on the one or more first displays by the same or another participant of the meeting.

17. The electronic meeting tool of claim 16 configured for use by a plurality of users in a meeting, there being processing devices each for coupling to a peripheral device for every user in the meeting, whereby the electronic meeting tool is configured to allow a first user action to connect a client processing device to the base unit, and a second user action comprising activating the actuator on the input device which is coupled to the peripheral device which then starts a process of obtaining the user selected arbitrary media content by screen scraping data from the processing device and transmitting screen scraped data for display to the base unit, whereby the base unit is configured to carry out graphical commands sent from the processing device.

18. The method according to claim 1, wherein running said program does not require installation of the program or configuration of the processing device.

19. The electronic meeting tool according to claim 16, wherein running said program does not require installation of the program or configuration of the processing device.

20. The method according to claim 1, further comprising a program adapted to be loaded onto the processing device and to run on an operating system of the processing device, said program being adapted to obtain the media content from the processing device, running said program on the processing device does not require installation of the program or configuration of the processing device.

* * * * *